United States Patent
Cummings et al.

(10) Patent No.: US 7,274,710 B2
(45) Date of Patent: Sep. 25, 2007

(54) ASYNCHRONOUS CROSSBAR WITH DETERMINISTIC OR ARBITRATED CONTROL

(75) Inventors: Uri Cummings, Oak Park, CA (US); Andrew Lines, Calabasas, CA (US)

(73) Assignee: Fulcrum Microsystems, Inc., Calabasas, CA (US)

( * ) Notice: Subject to any disclaimer, the term of this patent is extended or adjusted under 35 U.S.C. 154(b) by 989 days.

(21) Appl. No.: 10/237,406

(22) Filed: Sep. 6, 2002

(65) Prior Publication Data

US 2003/0146075 A1 Aug. 7, 2003

Related U.S. Application Data

(62) Division of application No. 10/136,025, filed on Apr. 30, 2002.

(60) Provisional application No. 60/352,131, filed on Jan. 25, 2002.

(51) Int. Cl.
*H04J 3/02* (2006.01)
(52) U.S. Cl. ..................... 370/462; 370/359
(58) Field of Classification Search ............... 370/351, 370/235, 401, 402, 411, 419, 465, 540, 539, 370/360, 384, 389, 462, 359, 471, 230
See application file for complete search history.

(56) References Cited

U.S. PATENT DOCUMENTS

| | | | |
|---|---|---|---|
| 4,475,188 A * | 10/1984 | Wilson et al. ............... 370/462 |
| 4,482,996 A * | 11/1984 | Wilson et al. ............... 370/392 |
| 4,680,701 A | 7/1987 | Cochran |
| 4,773,066 A | 9/1988 | Kirkman ..................... 370/85 |
| 4,849,751 A | 7/1989 | Barber et al. .......... 340/825.02 |
| 4,875,224 A | 10/1989 | Simpson |
| 4,912,348 A | 3/1990 | Maki et al. |
| 5,367,638 A | 11/1994 | Niessen et al. |
| 5,434,520 A | 7/1995 | Yetter et al. |
| 5,440,182 A | 8/1995 | Dobbelaere |
| 5,450,549 A * | 9/1995 | Casparian ................... 345/556 |
| 5,479,107 A | 12/1995 | Knauer |
| 5,517,495 A * | 5/1996 | Lund et al. ................. 370/399 |
| 5,572,690 A | 11/1996 | Molnar |
| 5,666,532 A | 9/1997 | Saks et al. |

(Continued)

FOREIGN PATENT DOCUMENTS

WO WO9207361 4/1992

(Continued)

OTHER PUBLICATIONS

Andrew Matthew Lines, *Pipelined Asynchronous Circuits*, Jun. 1995, revised Jun. 1998, pp. 1-37.

(Continued)

*Primary Examiner*—Brenda Pham
(74) *Attorney, Agent, or Firm*—Beyer Weaver LLP

(57) ABSTRACT

Methods and apparatus are described relating to a crossbar which is operable to route data from any of a first number of input channels to any of a second number of output channels according to routing control information. Each combination of an input channel and an output channel corresponds to one of a plurality of links. The crossbar circuitry is operable to route the data in a deterministic manner on each of the links thereby preserving a partial ordering represented by the routing control information. Events on different links are uncorrelated.

20 Claims, 20 Drawing Sheets

U.S. PATENT DOCUMENTS

| | | | |
|---|---|---|---|
| 5,732,233 | A | 3/1998 | Klim et al. |
| 5,752,070 | A | 5/1998 | Martin et al. .......... 395/800.33 |
| 5,802,055 | A | 9/1998 | Krein et al. ................ 370/402 |
| 5,802,331 | A | 9/1998 | Van Berkel |
| 5,832,303 | A | 11/1998 | Murase et al. .............. 395/856 |
| 5,889,919 | A | 3/1999 | Miller, Jr. et al. |
| 5,918,042 | A | 6/1999 | Furber |
| 5,920,899 | A | 7/1999 | Chu |
| 5,949,259 | A | 9/1999 | Garcia |
| 5,973,512 | A | 10/1999 | Baker |
| 6,002,861 | A | 12/1999 | Butts et al. ............ 395/500.37 |
| 6,038,656 | A | 3/2000 | Martin et al. ................ 712/211 |
| 6,044,061 | A | 3/2000 | Aybay et al. ............... 370/230 |
| 6,052,368 | A * | 4/2000 | Aybay ........................ 370/357 |
| 6,072,772 | A * | 6/2000 | Charny et al. .............. 370/229 |
| 6,152,613 | A | 11/2000 | Martin et al. |
| 6,230,228 | B1 | 5/2001 | Eskandari et al. .......... 710/129 |
| 6,279,065 | B1 | 8/2001 | Chin et al. .................. 710/129 |
| 6,301,630 | B1 | 10/2001 | Chen et al. ................. 710/129 |
| 6,301,655 | B1 | 10/2001 | Manohar et al. |
| 6,327,253 | B1 * | 12/2001 | Frink ......................... 370/260 |
| 6,374,307 | B1 | 4/2002 | Ristau et al. ............... 709/249 |
| 6,381,692 | B1 | 4/2002 | Martin et al. |
| 6,502,180 | B1 | 12/2002 | Martin et al. |
| 2002/0021694 | A1 | 2/2002 | Benayoun et al. .......... 370/386 |

OTHER PUBLICATIONS

Alain J. Martin, *Compiling Communicating Processes into Delay-Insensitive VLSI Circuits*, Dec. 31, 1985, Department of Computer Science California Institute of Technology, Pasadena, California, pp. 1-16.

Alain J. Martin, *Erratum: Synthesis of Asynchronous VLSI Circuits*, Mar. 22, 2000, Department of Computer Science California Institute of Technology, Pasadena, California, pp. 1-143.

U.V. Cummings, et al. *An Asynchronous Pipelined Lattice Structure Filter*, Department of Computer Science California Institute of Technology, Pasadena, California, pp. 1-8.

Alain J. Martin, et al. *The Design of an Asynchronous MIPS R3000 Microprocessor*, Department of Computer Science California Institute of Technology, Pasadena, California, pp. 1-18.

Lee et al., "Crossbar-Based Gigabit Packet Switch with an Input-Polling Shared Bus Arbitration Mechanism", Sep. 21, 1997, XVI World Telecom Congress Proceedings, Interactive Session 3—Systems Technology & Engineering, pp. 435-441.

Ghosh et al., "Distributed Control Schemes for Fast Arbitration in Large Crossbar Networks", Mar. 1994, IEEE Transactions on Very Large Scale Integration (VLSI) Systems, vol. 2, No. 1, pp. 55-67.

Venkat et al., "Timing Verification of Dynamic Circuits", May 1, 1995 IEEE 1995 Custom Integrated Circuits Conference.

Wilson, "Fulcrum IC heats asynchronous design debate", Aug. 20, 2002, http://fulcrummicro.com/press/article_eeTimes_08-20-02.shtml.

Martin, "Asynchronous Datapaths and the Design of an Asynchronous Adder", Department of Computer Science California Institute of Technology, Pasadena, California, pp. 1-24.

Martin, "Self-Timed FIFO: An Exercise in Compiling Programs into VLSI Circuit", Computer Science Department California Institute of Technology, pp. 1-21.

U.S. Appl. No. 09/501,638, filed on Feb. 10, 2000, entitled, "Reshuffled Communications Processes in Pipelined Asynchronous Circuits".

* cited by examiner (a)

(b)

(c)

ASYNCHRONOUS CROSSBAR WITH DETERMINISTIC OR ARBITRATED CONTROL

RELATED APPLICATION DATA

The present application is a divisional application of U.S. patent application Ser. No. 10/136,025 for ASYNCHRONOUS CROSSBAR WITH DETERMINISTIC OR ARBITRATED CONTROL filed on Apr. 30, 2002 which claims priority from U.S. Provisional Patent Application No. 60/352,131 for ASYNCHRONOUS CROSSBAR CIRCUIT WITH DETERMINISTIC OR ARBITRATED CONTROL filed on Jan. 25, 2002, the entire disclosure of which is incorporated herein by reference for all purposes.

BACKGROUND OF THE INVENTION

The present invention relates to asynchronous digital circuit design and in particular to an asynchronous crossbar and associated control circuits.

The ever increasing demand for simultaneously faster and more complex digital circuits, e.g., microprocessors, has pushed conventional digital circuit design methodologies to their limits. Because of the combination of high clock rates (i.e., greater than 100 MHz) and design complexity (e.g., very large scale integration (VLSI) devices with 10 million or more transistors), signal propagation delay has become a dominant design consideration. It has become clear that a significant design paradigm shift will be necessary if digital circuit design is to continue its historical adherence to Moore's law.

Asynchronous VLSI is an active area of research and development in digital circuit design. It refers to all forms of digital circuit design in which there is no global clock synchronization signal. Delay-insensitive asynchronous designs, by their very nature are insensitive to the signal propagation delays which have become the single greatest obstacle to the advancement of traditional design paradigms. That is, delay-insensitive circuit design maintains the property that any transition in the digital circuit could have an unbounded delay and the circuit will still behave correctly. The circuits enforce sequencing but not absolute timing. This design style avoids design and verification difficulties that arise from timing assumptions, glitches, or race conditions.

Generally speaking, synchronous design styles are facing serious performance limitations. Certain asynchronous design methodologies also have difficulties with some of the same types of limitations, e.g., race conditions. By contrast, the delay-insensitive branch of asynchronous digital design, because of its relative immunity to these limitations, appears to hold great promise for supporting future advancements in the performance of digital circuits.

For background information regarding delay-insensitive asynchronous digital design, please refer to the following papers: A. J. Martin, "Compiling Communicating Processes into Delay-Insensitive Circuits," *Distributed Computing*, Vol. 1, No. 4, pp. 226–234, 1986; U. V. Cummings, A. M. Lines, A. J. Martin, "An Asynchronous Pipelined Lattice Structure Filter." *Advanced Research in Asynchronous Circuits and Systems*, IEEE Computer Society Press, 1994; A. J. Martin, A. M. Lines, et al, "The Design of an Asynchronous MIPS R3000 Microprocessor." *Proceedings of the 17th Conference on Advanced Research in VLSI*, IEEE Computer Society Press, 1997; and A. M. Lines, "Pipelined Asynchronous Circuits." *Caltech Computer Science Technical Report* CS-TR-95-21, Caltech, 1995; the entire disclosure of each of which is incorporated herein by reference for all purposes.

See also U.S. Pat. No. 5,752,070 for "Asynchronous Processsors" issued May 12, 1998, and U.S. Pat. No. 6,038,656 for "*Pipelined Completion for Asynchronous Communication*" issued on Mar. 14, 2000, the entire disclosure of each of which is incorporated herein by reference for all purposes.

If asynchronous digital design techniques are to be the digital design methodology which enables the performance of digital circuits and systems to continue to improve in accordance with historical norms, the basic building blocks of such circuits and systems must be provided which rival and exceed the performance of their synchronous counterparts.

SUMMARY OF THE INVENTION

According to the present invention, circuits are provided which solve critical problems in asynchronous VLSI design. According to one embodiment, a P to Q crossbar is provided which can route P input channels to Q output channels in all possible combinations. According to another embodiment, a dispatcher is provided which is operable to control a crossbar circuit in a deterministic fashion by routing inputs to specified outputs preserving the given partial order on each channel. According to yet another embodiment, an arbitration mechanism is provided which is operable to control the routing of the inputs of a crossbar circuit to its outputs in a non-deterministic fashion.

Thus, according to various embodiments, the present invention provides methods and apparatus relating to a crossbar which is operable to route data from any of a first number of input channels to any of a second number of output channels according to routing control information. Each combination of an input channel and an output channel corresponds to one of a plurality of links. The crossbar circuitry is operable to route the data in a deterministic manner on each of the links thereby preserving a partial ordering represented by the routing control information. Events on different links are uncorrelated.

According to another set of embodiments, a dispatcher is provided which is operable to route an ordered stream of instructions received on a first number of input channels to designated ones of a second number of output channels according to instruction routing information. The dispatcher includes dispatch circuitry which is operable to route the instructions to each output channel in a deterministic manner thereby preserving a partial ordering for each output channel defined in the ordered stream. Instructions on different output channels are uncorrelated.

According to yet another set of embodiments, an arbiter is provided which is operable to route a plurality of instructions received on a first number of input channels to designated ones of a second number of output channels according to instruction routing information. The arbiter includes arbitration circuitry which is operable to arbitrate between instructions received on different input channels and designating a same output channel, and prevent any of the different input channels from transmitting a subsequent instruction until arbitration between the different input channels is complete.

A further understanding of the nature and advantages of the present invention may be realized by reference to the remaining portions of the specification and the drawings.

DETAILED DESCRIPTION OF SPECIFIC EMBODIMENTS

Figure 1:
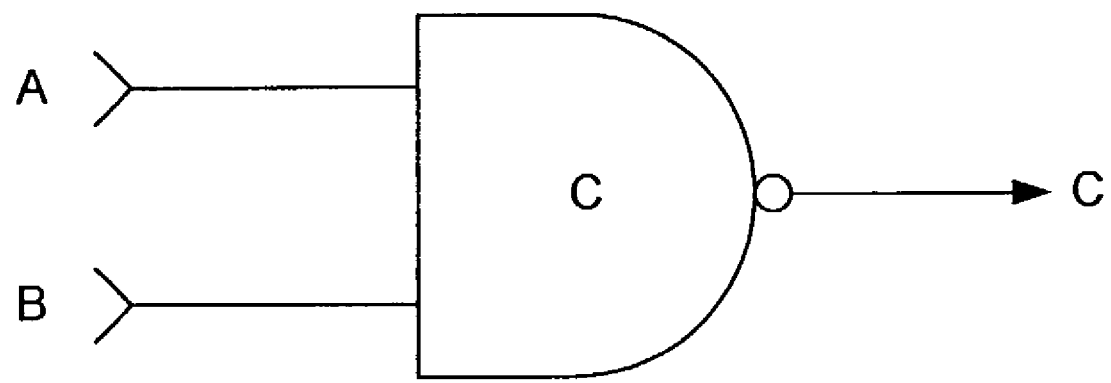
FIG. 1 illustrates a Mueller consensus element.
Figure 1:
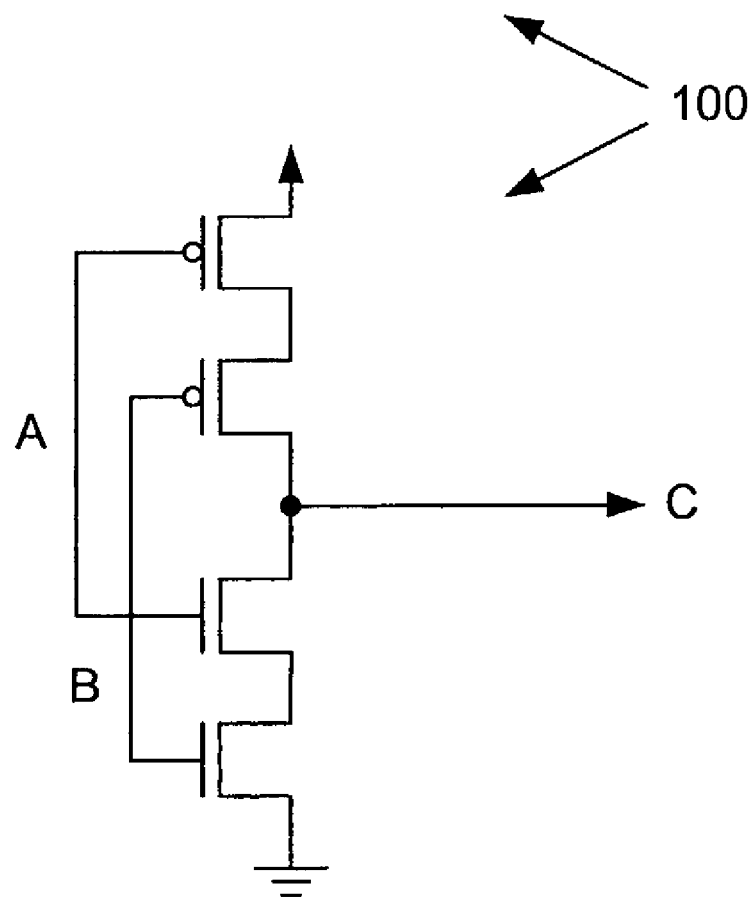

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order not to unnecessarily obscure the present invention.

At the outset, it should be noted that many of the techniques and circuits described in the present application are described and implemented as delay-insensitive asynchronous VLSI. However it will be understood that many of the principles and techniques of the invention may be used in other contexts such as, for example, non-delay insensitive asynchronous VLSI and synchronous VLSI.

It should also be understood that the various embodiments of the invention may be implemented in a wide variety of ways without departing from the scope of the invention. That is, the asynchronous processes and circuits described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., FPGAs) suitable for designing and manufacturing the processes and circuits described herein are within the scope of the invention.

The present application also employs the pseudo-code language CSP (concurrent sequential processes) to describe high-level algorithms. CSP is typically used in parallel programming software projects and in delay-insensitive VLSI. It will be understood that the use of this particular language and notation is merely exemplary and that the fundamental aspects of the present invention may be represented and implemented in a wide variety of ways without departing from the scope of the invention.

In addition, transformation of CSP specifications to transistor level implementations for various aspects of the circuits described herein may be achieved according to the techniques described in "Pipelined Asynchronous Circuits" by A. Lines (incorporated by reference above). However, it should be understood that any of a wide variety of asynchronous design techniques may also be used for this purpose.

The CSP used herein has the following structure and syntax. A process is static and sequential and communicates with other processes through channels. Together a plurality of processes constitute a parallel program. The [and] demark if statements, and a*[and] demark loops.

Multiple choices can be made by adding pairs of B→S inside an if statement or a loop, separated by a (indicates deterministic selection) or a | (indicates non-deterministic selection), where B is a Boolean expression and S is a statement. Thus [B1→S1 B2→S2] means if expression B1 is true, execute S1 or if expression B2 is true, execute S2. If neither B1 or B2 is true, this statement will wait until one is (unlike an if-else construct). The shorthand *[S] means repeat statement S infinitely. The shorthand [B] means wait for boolean expression B to be true. Local variables are assumed to be integers, and can be assigned to integer expressions as in x:=y+1. The semicolon separates statements with strict sequencing. The comma separates statements with no required sequencing. The question mark and exclamation point are used to denote receiving from and sending to a channel, respectively. Thus *[A?x; y:=x+1; B!y] means receive integer x from channel A, then assign integer y to the expression x+1, then send y to channel B, then repeat forever.

According to various specific embodiments of the invention, the latching of data happens in channels instead of registers. Such channels implement a FIFO (first-in-first-out) transfer of data from a sending circuit to a receiving circuit. Data wires run from the sender to the receiver, and an enable (i.e., an inverted sense of an acknowledge) wire goes backward for flow control. According to specific ones of these embodiments, a four-phase handshake between neighboring circuits (processes) implements a channel. The four phases are in order: 1) Sender waits for high enable, then sets data valid; 2) Receiver waits for valid data, then lowers enable; 3) Sender waits for low enable, then sets data neutral; and 4) Receiver waits for neutral data, then raises enable. It should be noted that the use of this handshake protocol is for illustrative purposes and that therefore the scope of the invention should not be so limited.

According to specific embodiments, the delay-insensitive encoding of data is dual rail, also called 1of2. In this encoding, 2 wires (rails) are used to represent 2 valid states and a neutral state. When both wires are low, the data is neutral. When the first wire is high the data is valid 0. When the second wire is high the data is a valid 1. Both wires aren't allowed to be high at once. The wires associated with channel X are written $X^0$, $X^1$ for the data, and $X^e$ for the enable.

According to other embodiments, larger integers are encoded by more wires, as in a 1of3 or 1of4 code. For much larger numbers, multiple 1ofN's are used together with different numerical significance. For example, 32 bits can be represented by 32 1of2 codes or 16 1of4 codes. In this case, a subscript indicates the significance of each 1ofN code, i.e., $L_g^r$ is the rth wire of the gth bit (or group), and $L_g^e$ is the associated enable.

According to still other embodiments, several related channels may be organized into a 1-D or 2-D array, such as L[i] or V [i,j]. To identify individual wires in such embodiments, the notation $L[i]^r$ or $L[i]_g^r$ is used.

According to a specific embodiment, the design of a crossbar according to the invention employs a method described in U.S. Pat. No. 6,038,656 (incorporated herein by reference above) to improve the speed of large datapaths. This method describes a way of breaking up the datapath into multiple datapaths of smaller bit sizes, for example, reducing one thirty-two bit datapath into four eight bit datapaths, while preserving insensitivity to delays.

Figures in this disclosure include box and arrow diagrams and transistor diagrams. In the box diagrams, the boxes represent circuits or processes and the arrows represent FIFO channels between the boxes. FIFO channels may also exist within the boxes. Any channel or wire with the same name is intended to be connected, even when no connection is drawn. Sometimes the "internal" port names of a circuit are drawn inside the box next to an incoming or outgoing channel.

In the transistor diagrams, arrows (or lines) represent individual wires. Standard gate symbols are used wherever possible, with the addition of a C-element, drawn like a NAND gate with a "C" on it. This gate is a standard asynchronous gate, also called a Mueller C-element or a consensus element. A gate representation and a transistor level implementation of a C-element 100 are shown in FIG. 1.

It should be noted that for the purpose of clarity, certain features are omitted from the circuit diagrams. For example, some circuit nodes are "dynamic" which means that they are not always driven high or low, and are expected to hold their state indefinitely. This requires a "staticizer," i.e., a pair of small cross-coupled inverters attached to the node. Staticizers are omitted, but can be inferred to exist on any node where the pull-up and pull-down networks are not logical complements (essentially all non-standard gates and C-elements). In addition, most of these pipelined circuits must be reset to an initial state when the chip boots, which requires a few extra transistors using Reset and $\overline{\text{Reset}}$ signals. Usually the reset state is achieved by forcing the left enables low while Reset is asserted.

Figure 2:
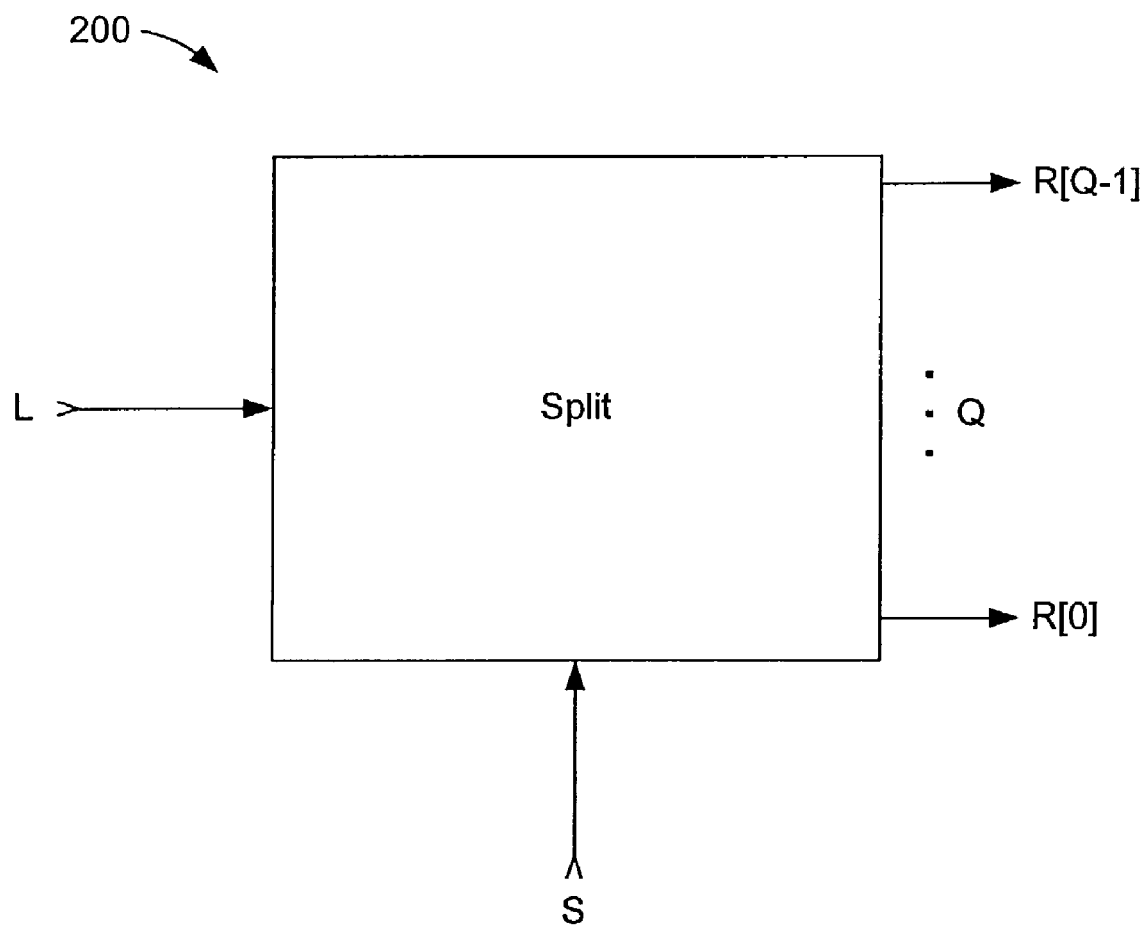
FIG. 2 is a representation of a Q-way split.
Figure 3:
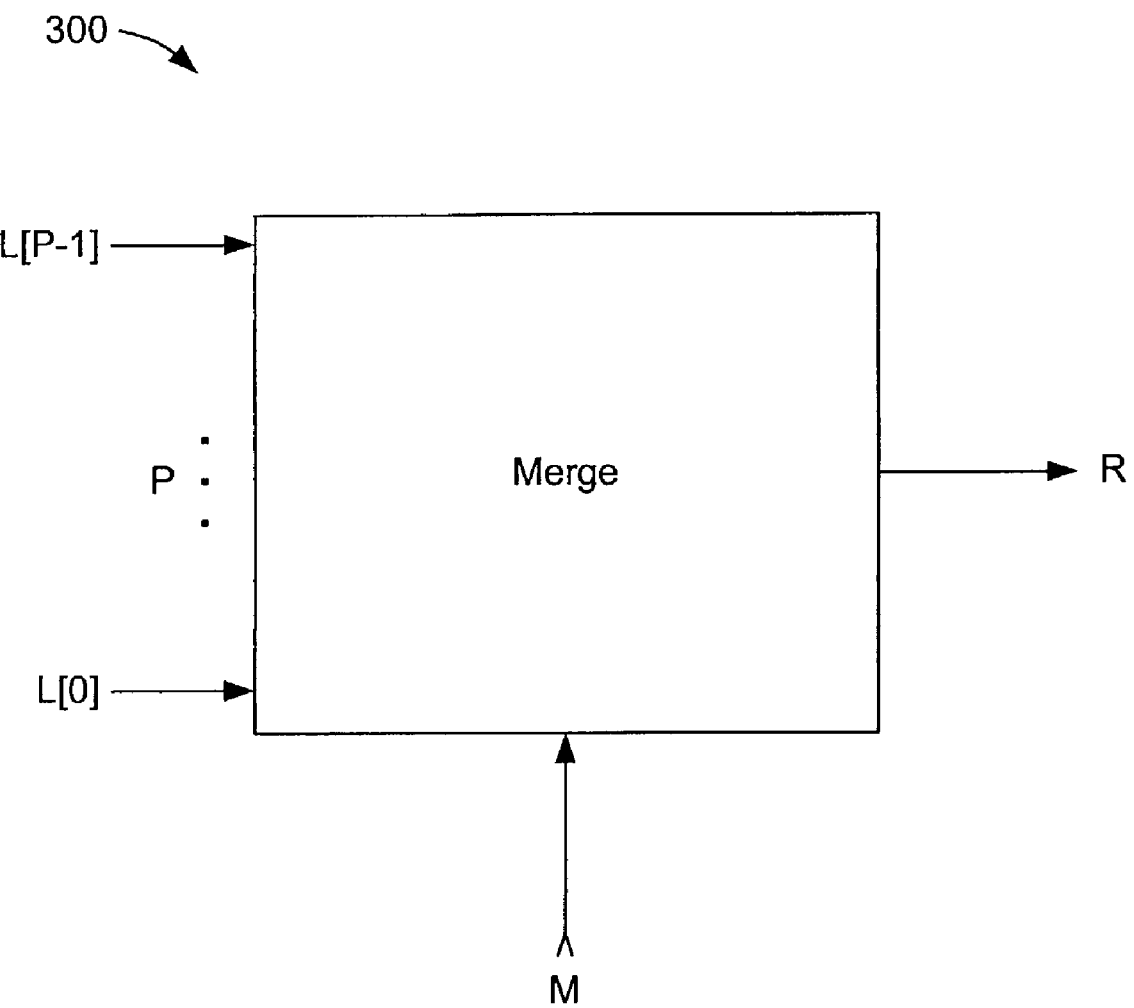
FIG. 3 is a representation of a P-way merge.

As described herein, a Split is a 1 to Q bus which reads a control channel S, reads one token of input data from a single L channel, then sends the data to one of Q output channels selected by the value read from S. A Merge is a P to 1 bus which reads a control channel M, then reads a token of data from one of P input channels as selected by the value read from M, then sends that data to a single output channel R. FIG. 2 shows a basic block diagram of a Split 200. FIG. 3 shows a basic block diagram of a Merge 300. See also "Pipelined Asynchronous Circuits" by A. Lines incorporated by reference above.

Figure 4:
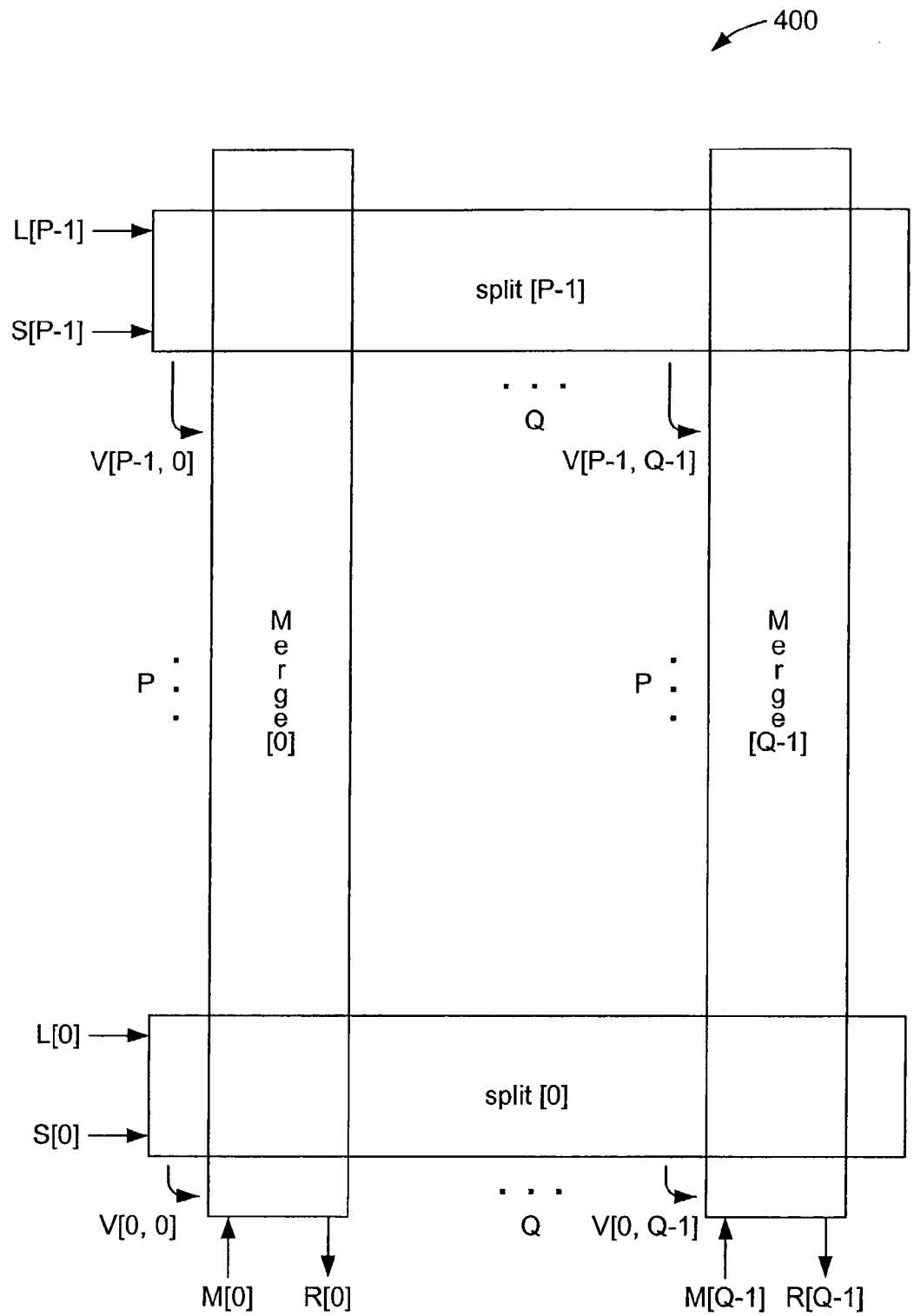
FIG. 4 is a simplified representation of an asynchronous crossbar.

According to various embodiments of the invention, a P to Q crossbar 400 may be constructed from P Q-way splits and Q P-way merges as shown in FIG. 4. The ith of the P split busses, i.e., split[i], runs the program *[S[i]?j, L[i]?x; V [i,j]!x]. The jth of the Q merge busses, i.e., merge[j], runs the program *[M[j]?i; V [i,j]?x; R[j]!x]. According to a first asynchronous crossbar design which may be employed with various embodiments of the invention, the V [i,j] represent intermediate data channels between the split data outputs and the merge data inputs. According to specific embodiments of the invention described below, these channels have been eliminated.

Crossbar 400 is controlled from both the input and output sides via the S[i] and M[j] control channels. Based on the information in these control channels, the sequence of tokens sent through each channel is completely deterministic with respect to the input and output channels, but not with respect to any larger group of channels. That is, the timing of communications on unrelated channels is unconstrained. Any two unrelated pairs of input/output ports can communicate in parallel without any contention. If two input/ouput transfers refer to the same input or output port, the control stream associated with that port will unambiguously determine the ordering. Various techniques for generating the information in these control channels are described below.

As mentioned earlier in this document, one type of asynchronous crossbar designed according to the present invention includes actual channels V [i,j] for passing information from a split bus to the designated merge bus. These channels may be used to advantage in a variety of ways. For example, varying amounts of buffering may be added to the intermediate channels associated with each link to achieve various performance objectives. However, because of these channels and the associated handshaking overhead, the size and/or power consumption of an asynchronous crossbar designed in such manner could be prohibitive depending upon the magnitude of either P or Q.

Thus, a specific embodiment of the invention provides a crossbar design which eliminates at least some of these channels by combining at least a portion of the split and merge functionalities into a single router cell (the notation router_cell is also used herein). The externally visible behavior of an asynchronous crossbar designed according to this embodiment is virtually identical to that of the same size (i.e., P to Q) crossbar including the V [i,j] channels except that the enhanced crossbar design has one stage less slack (i.e., pipeline depth).

A specific embodiment of a crossbar designed according to the present invention will now be described with reference to FIGS. 5–8. According to this implementation, each split bus includes one split_env part and Q split_cell parts, and each merge bus includes one merge_env part and P merge_cell parts. The split_cell contains the part of the split bus replicated for each output channel, and the split_env contains the rest of the circuitry. Likewise, the merge_cell contains the part of the merge bus replicated for each input channel. As will be discussed with reference to FIG. 9, and according to a specific embodiment, the functionalities of each pair of split_cell and merge_cell corresponding to a particular input/output combination is combined into a single router_cell, thus eliminating the intervening channels between the split and merge busses.

Figure 5:
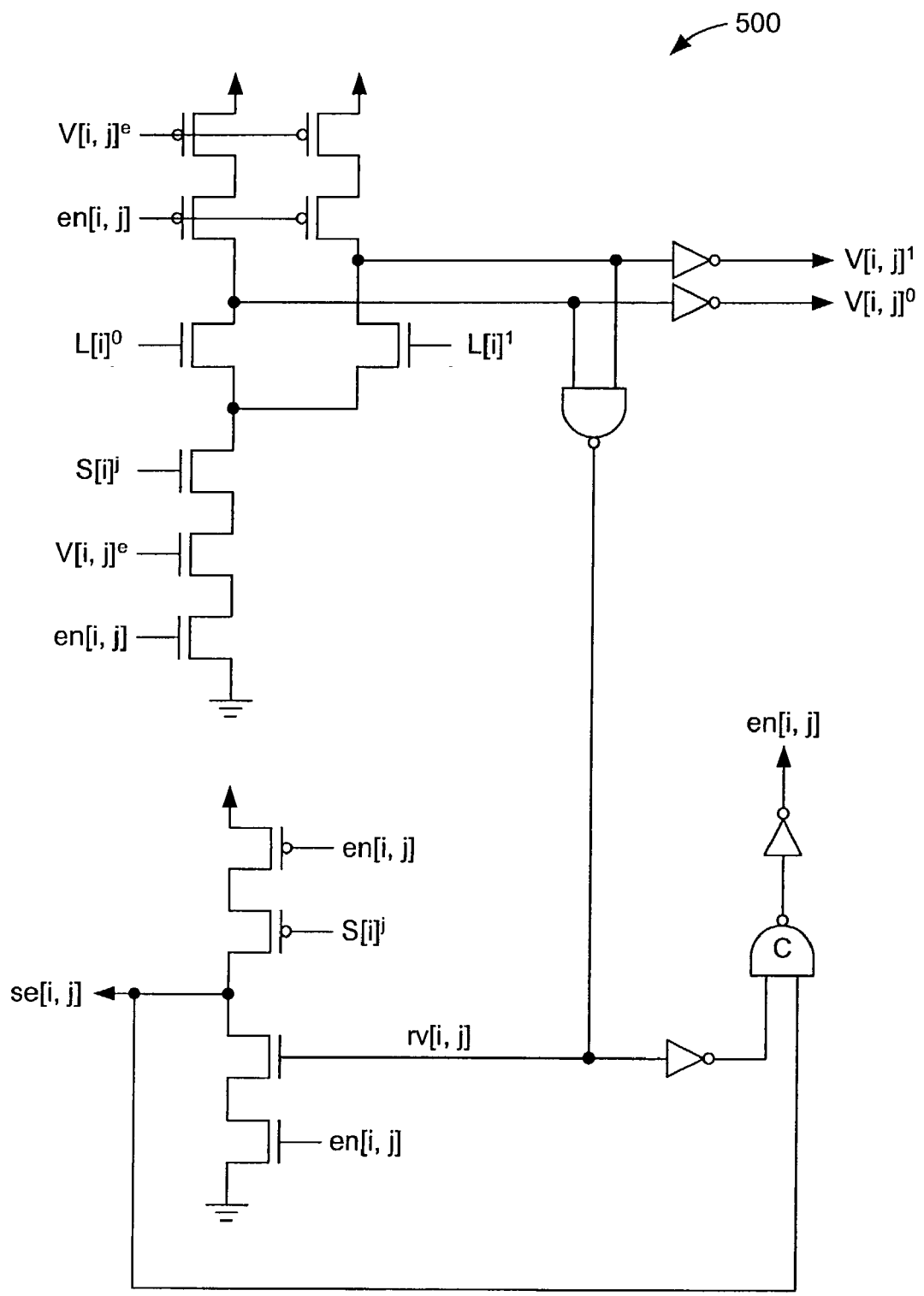
FIG. 5 is a schematic representation of a first portion of split bus.

Functionally, each split_cell[i,j] waits for S[i] to be valid and checks that the value of S[i] equals j (that is, $S[i]^j$ is true). If so, it checks the enable from its output $V[i,j]^e$ and when that is high, it copies the valid data from L[i] to V[i,j]. Once the data are copied to V[i,j], the split_cell[i,j] lowers its enable to the split_env, se[i,j]. Eventually, the S[i], L[i], and $V[i,j]^e$ return to neutral, so that the split_cell[i,j] can reset the data and raise se[i,j] again. A schematic for a split_cell 500 with 1-bit data and 1-bit control (both encoded as 1of2 codes) is shown in FIG. 5.

Figure 6:
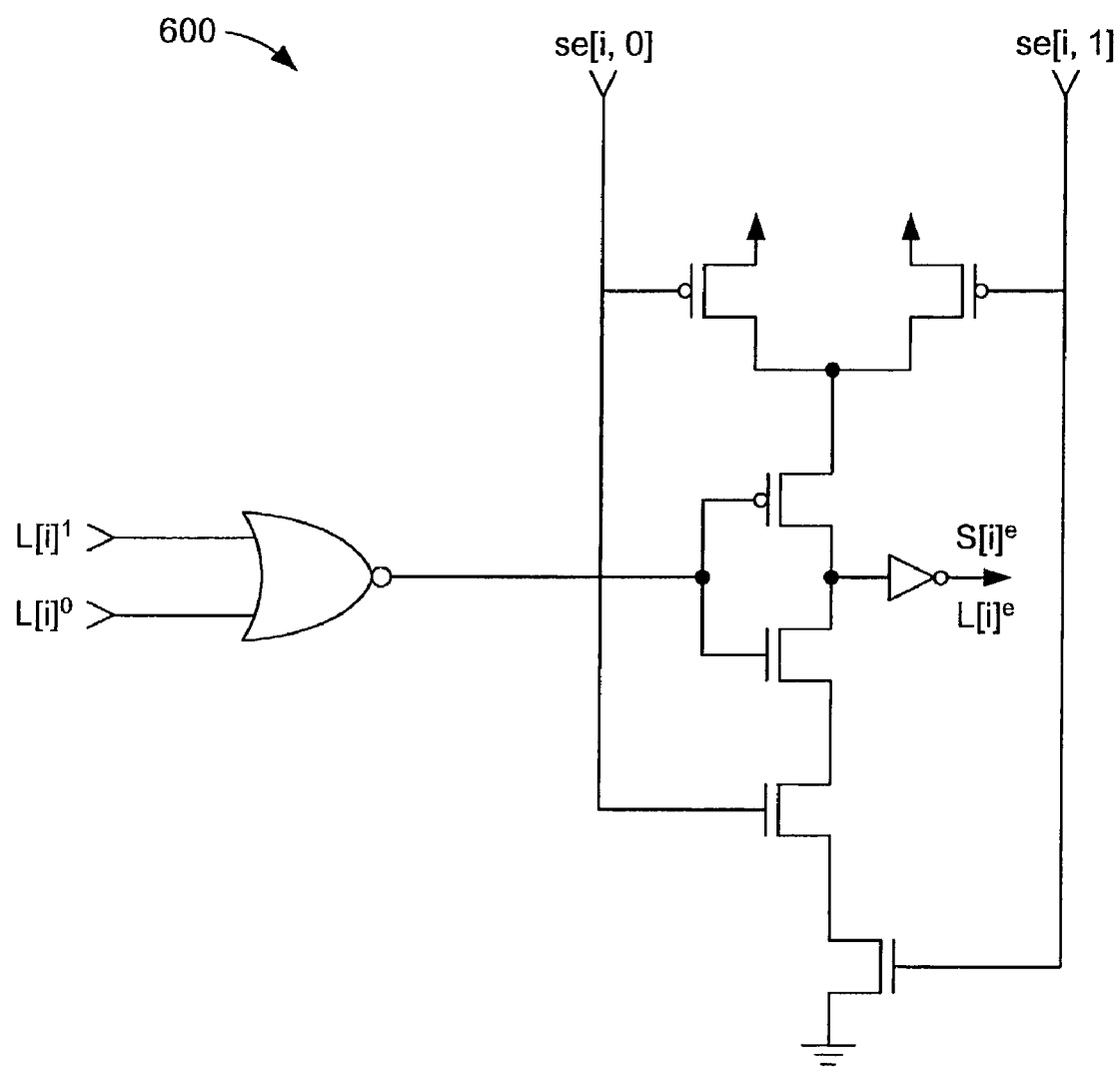
FIG. 6 is a schematic representation of a second portion of a split bus.

The split_env[i] tests the validity and neutrality of the L[i] channel, computes the logical AND of the se[i, 0 ... Q−1]'s from the split_cell's, and produces an acknowledge for the S[i] and L[i] input channels. The validity and neutrality of the S[i] channel is implied by the acknowledges from the split_cell's. A schematic for a split_env 600 for 1-bit data and 2 split_cell's is shown in FIG. 6.

Figure 7:
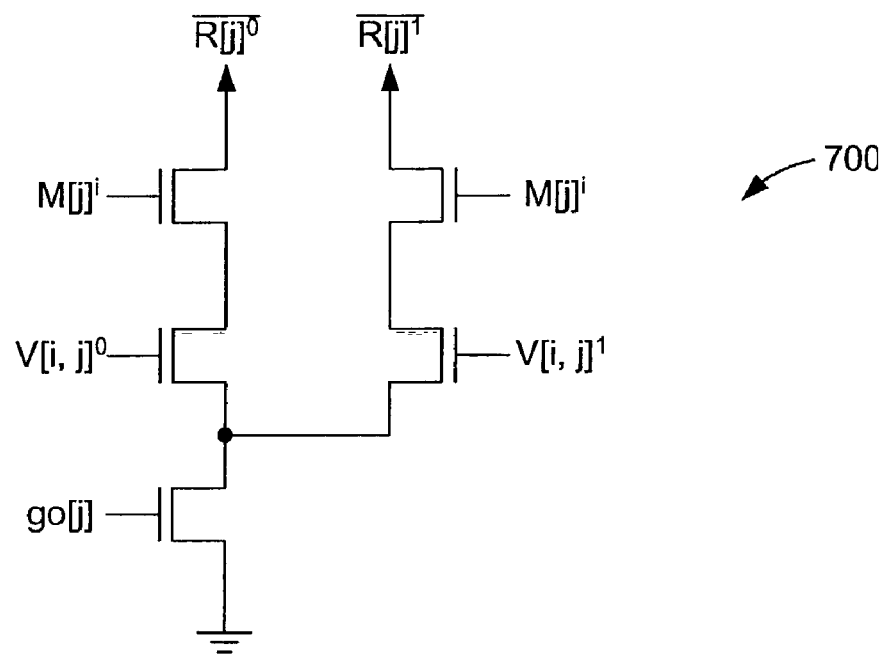
FIG. 7 is a schematic representation of a first portion of a merge bus.
Figure 7:
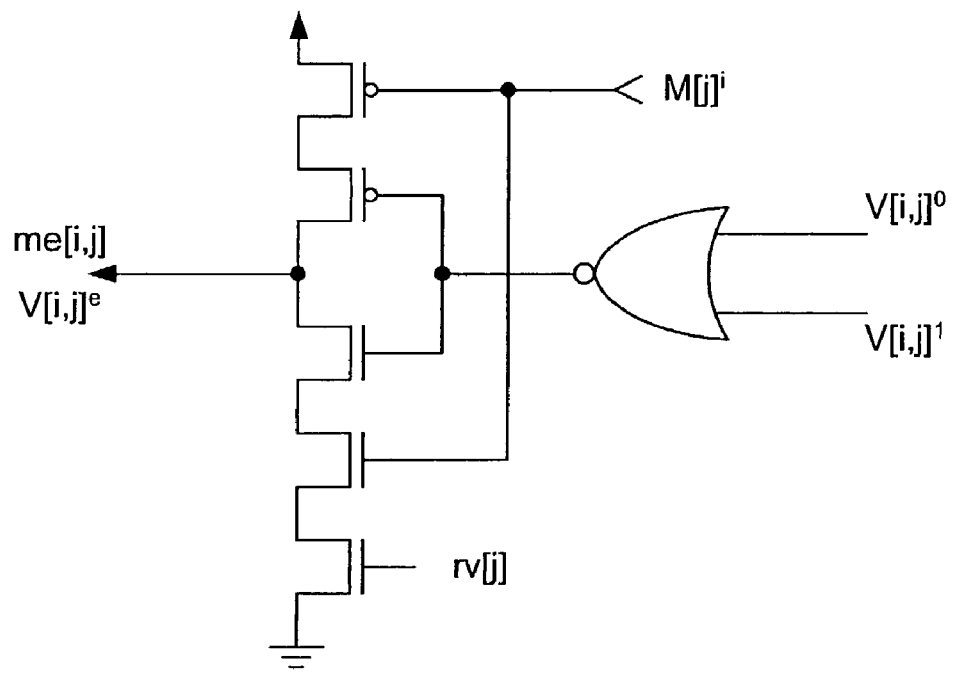

Each merge_cell[i,j] waits for M[j] to be valid and checks that the value of M[j] equals i (that is, $M[j]^1$ is true). If so, it waits for a go[j] signal from the merge_env (which includes the readiness of the output enable $R[j]^e$) and for the input data V[i,j] to be valid. When this happens, it copies the value of V[i,j] to R[j]. The merge_env checks the validity of R[j] and broadcasts this condition back to all the merge_cells's by setting rv[j] high. Next, the merge_cell lowers its enables me[i,j] and $V[i,j]^e$. Once the M[j] and V[i, j] data return to neutral, and go[j] is lowered, the R[j] is returned to neutral, rv[j] is lowered, and the merge_cell raises the enables me[i,j] and $V[i,j]^e$. A schematic for a merge_cell 700 with 1-bit data and 1-bit control (encoded as 1of2 codes) is shown in FIG. 7.

Figure 8:
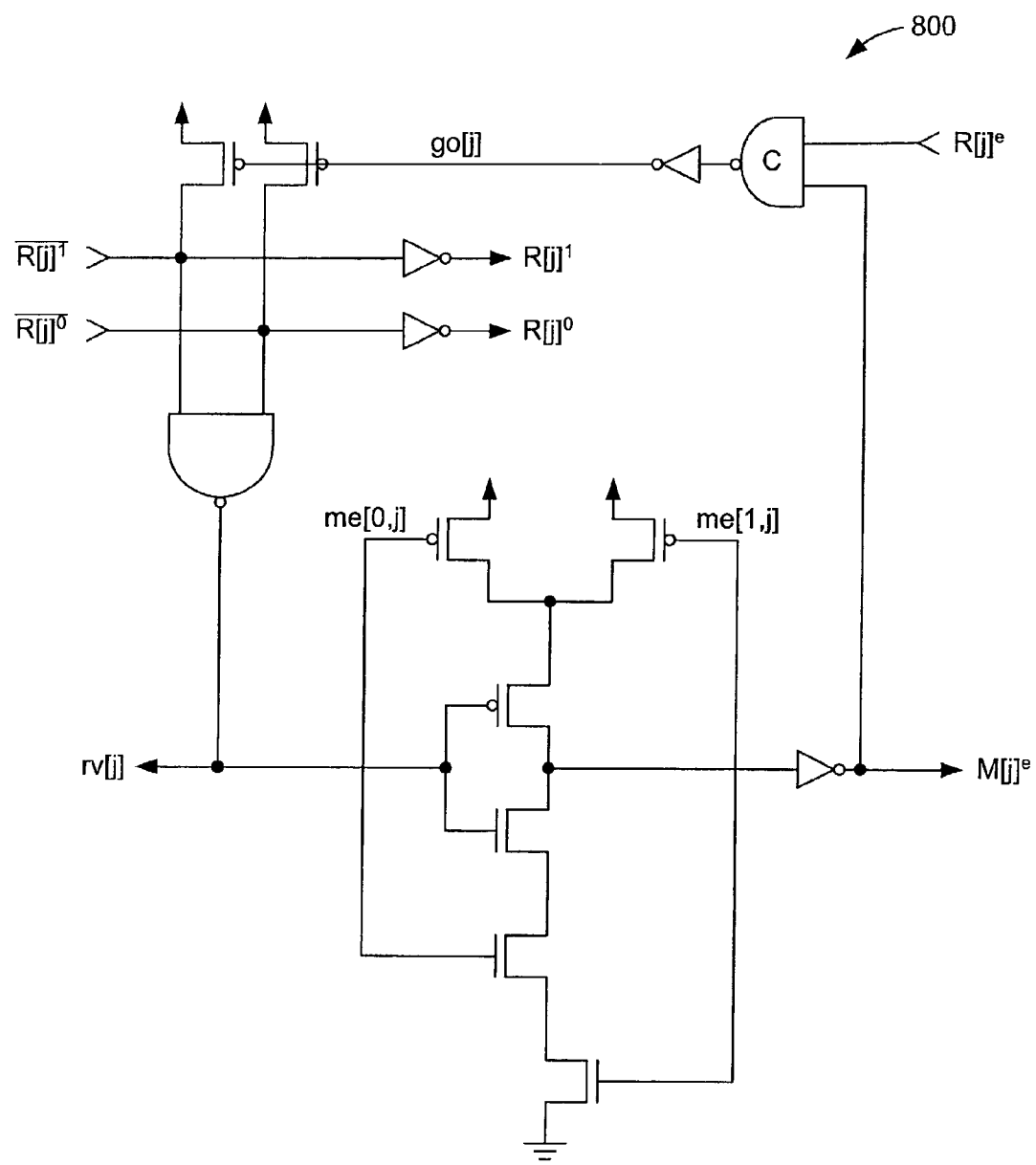
FIG. 8 is a schematic representation of a second portion of a merge bus.

The merge_env checks the readiness of the R[j] acknowledge and raises go[j]. The M[j] goes directly to the merge_cell's, one of which responds by setting R[j] to a new valid value. The merge_env then raises rv[j], after which the merge_cell replies with me[i, j]. The merge_env[j] checks the completion of these actions, and then acknowledges M[j]. Once M[j] has become neutral again and R[j] has acknowledged, the merge_env[j] lowers go[j], which causes the merge_cell's to reset me[i,j]. The merge_env[] also resets R[j] to the neutral value. Once these actions have been completed, the merge_env[j] lowers the acknowledge of M[j]. A schematic for a merge_env 800 for 1-bit data and 2 merge cells is shown in FIG. 8.

According to another specific embodiment of the invention, at each grid in a crossbar (i.e., for each combination of i and j) there is a router_cell[i,j] which combines the functionalities of one split_cell[i,j] and one merge_cell[i,j] as described above. The split_env[i] and merge_env[j] communicate with their router_cell's using the handshaking protocol described above. The router_cell waits for the superset of all conditions of the separate split_cell and merge cell and performs the actions of both with respect to their env's.

It should be noted that embodiments of the invention are envisioned in which only selected links are implemented with the router_cell of the present invention. According to such embodiments, other links are implemented using the split_cell and merge_cell of FIGS. 5 and 7 and their associated intermediate channels V[i,j]. Such embodiments might be useful where, for example, additional buffering is desired on one or more specific links, but it is undesirable to pay the area penalty associated with having intermediate channels for every link.

According to an even more specific embodiment, the router_cell does the following. It waits for its S[i] input to be valid and equal to j, for its M[j] input to be valid and equal to i, for L[i] to be valid, and for go[j] from the merge_env to be high. Once all this happens, the router_cell[i,j] copies L[i] directly to R[j] without an intermediate V[i,j] channel. The merge_env[j] detects that the R[j] has been set, and signals that by raising rv[j]. Then the router_cell[i,j] can lower its enables to the env's, se[i,j] and me[i,j], which can be the same signal.

Figure 9:
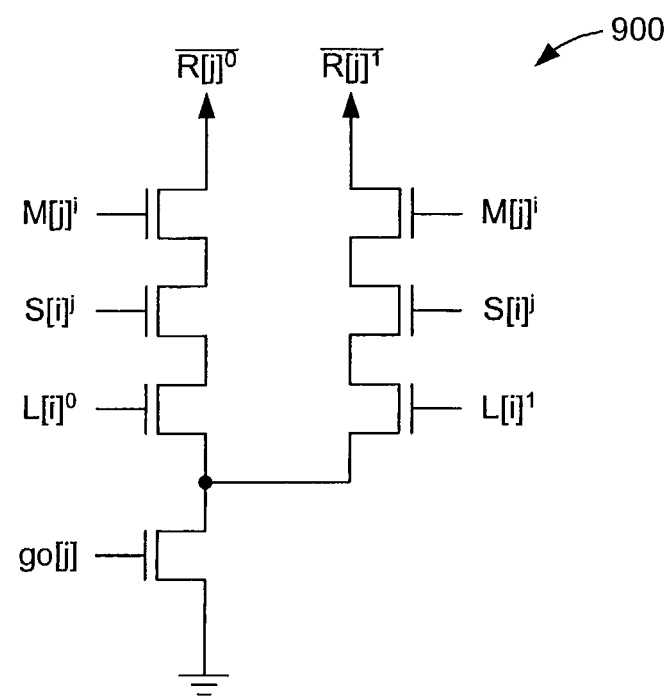
FIG. 9 is a schematic representation of a first implementation of a router cell.
Figure 9:
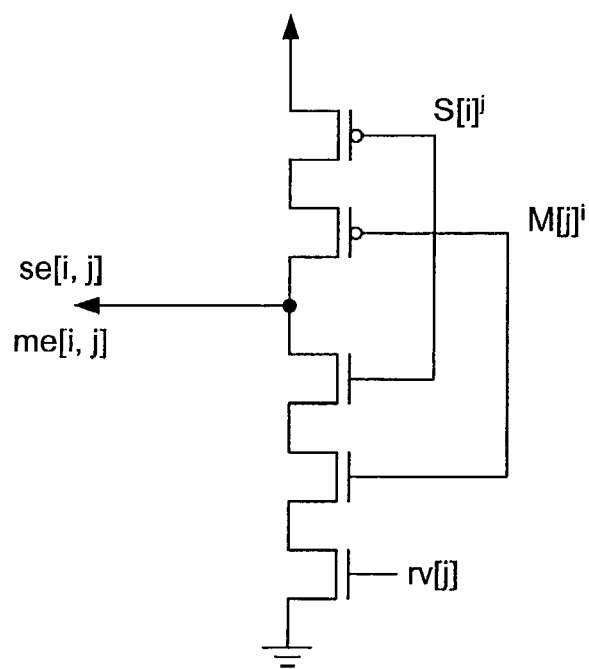

The reset phase proceeds symmetrically. The router_cell waits for S[i] and M[j] to be neutral and go[j] to go down. The merge_env[j] will reset the R[j] to neutral, and then signal the completion by lowering rv[j]. Finally, the router_cell[i,j] raises its enables to both env's. The schematic for a router_cell 900 with 1-bit data and 1-bit S[i] and M[j] is shown in FIG. 9. According to a specific embodiment, the split_env and merge_env employed with router_cell 900 may be the same as those used with separate split_cell's and merge cell's (see FIGS. 6 and 8 above).

As will be understood and according to various embodiments, either of the basic crossbar implementations can be extended to different data sizes and P and Q values. There are also several circuit variations which may improve area or speed described subsequently. That is, various different data encodings, router cell circuit implementations, and other circuit implementation variations described subsequently represent various tradeoffs between area and speed.

According to various embodiments, the S[i] may be encoded with a 1ofQ channel to select among Q possible split_cells. This increases the fanout on the S wires, and requires a larger AND tree to combine the se[i,j]'s in the split_env. Likewise, the M[j] may be encoded with a 1ofP channel to select among P possible merge_cell's. The number of control wires scales linearly with P and Q, which is suitable for smaller crossbars, e.g., 8 by 8 or smaller. According to even more specific embodiments, the AND trees for se and me are physically distributed across the datapath to reduce wiring.

For larger crossbars, e.g., 16 by 16 or larger, the S[i] and M[j] can each be encoded with a pair of 1ofN codes 1ofA by 1ofB, which yields A*B possibilities. The least and most significant halves of the S control are called $S[i]_0$ and $S[i]_1$. Likewise for $M[j]_0$ and $M[j]_1$. The wiring cost of this encoding scales with the $\sqrt{P}$ or $\sqrt{Q}$, and works well up to 64 by 64 crossbars. In a delay-insensitive design, it is possible to check only one of the $S[i]_0/S[i]_1$ pair for neutrality in the router_cell, provided the split_env checks the other one. Likewise for the $M[j]_0/M[j]_1$ pair.

Figure 10:
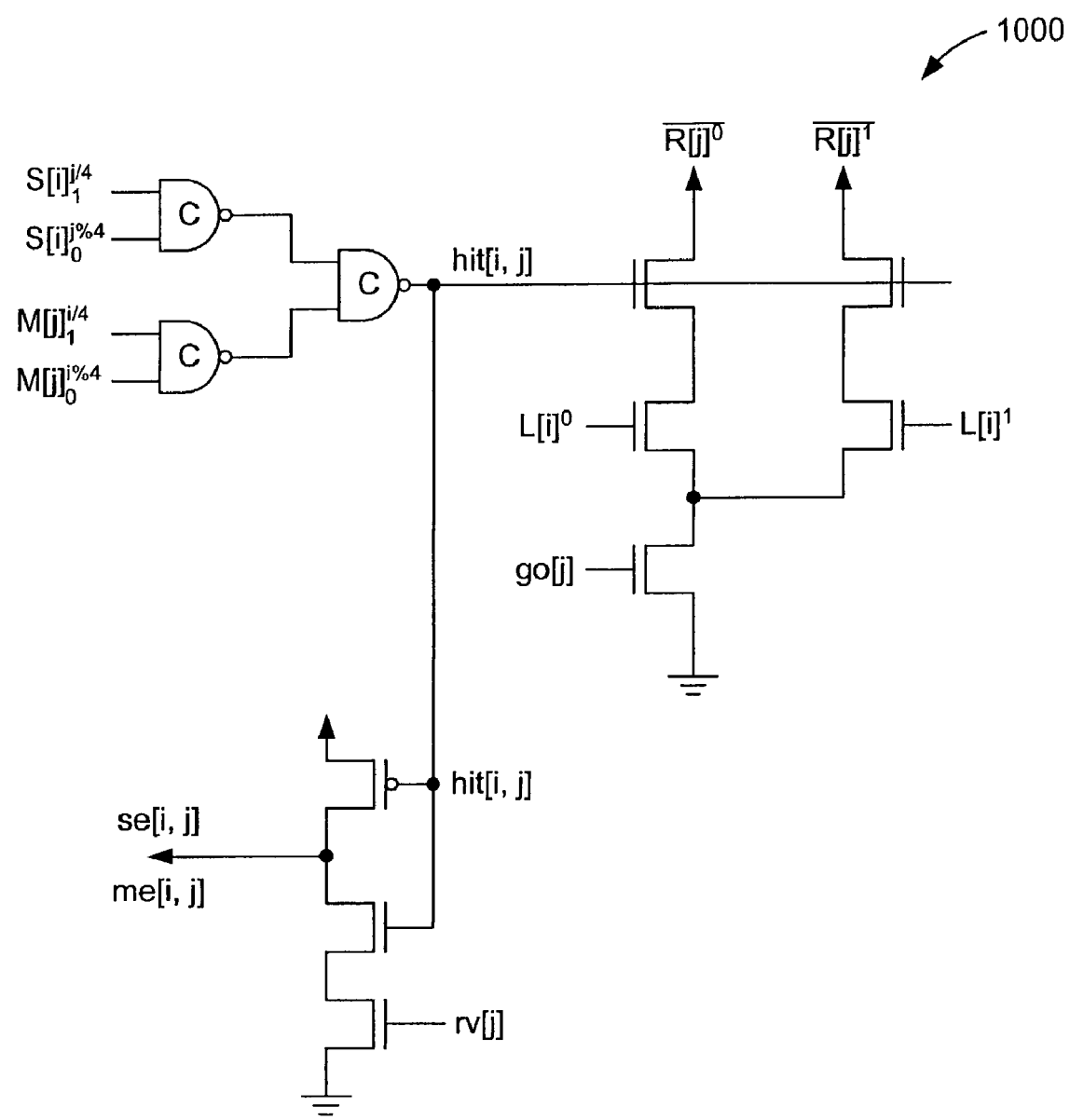
FIG. 10 is a schematic representation of a second implementation of a router cell.
Figure 11:
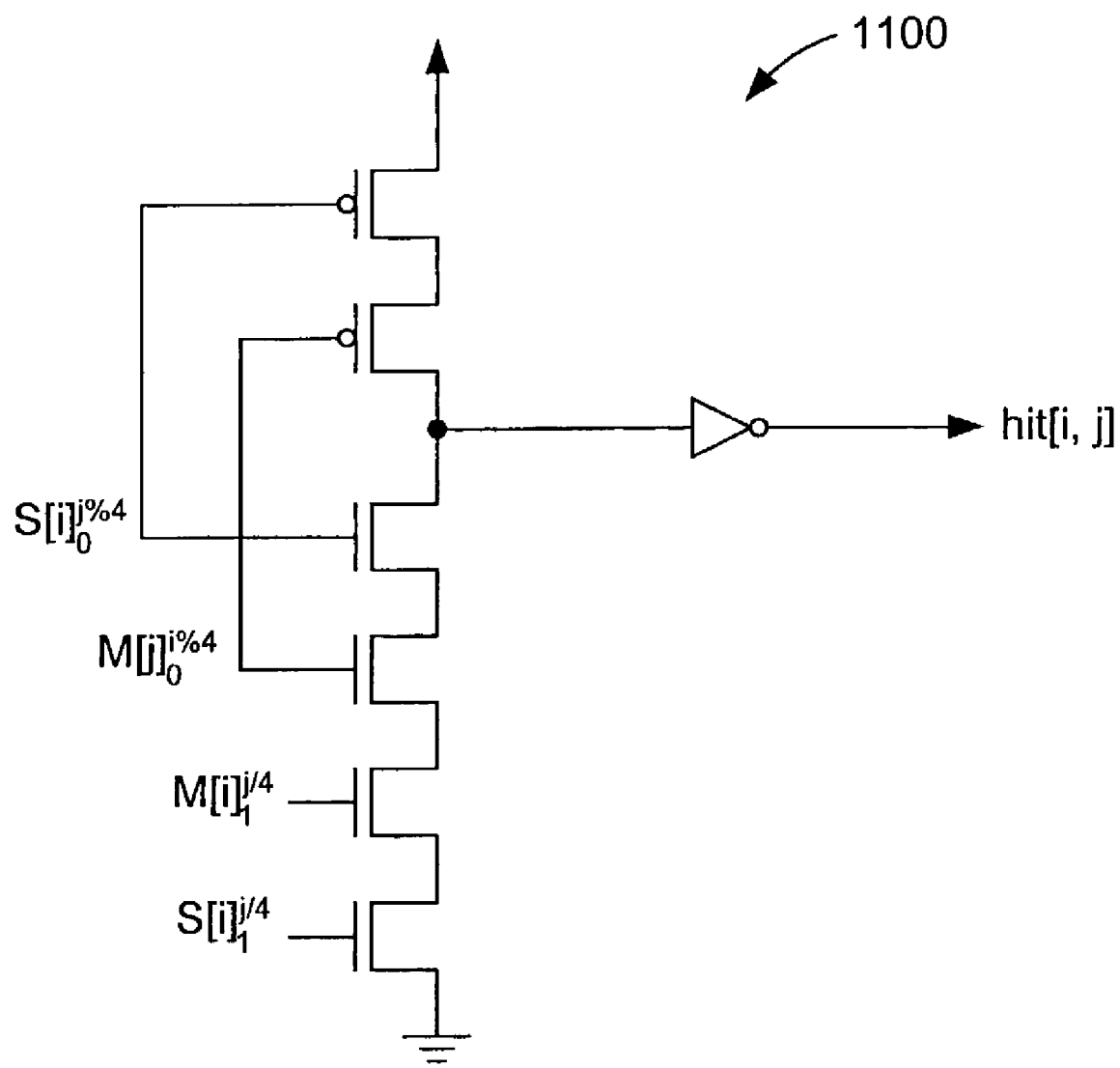
FIG. 11 is a schematic representation of a third implementation of a router cell.

With a large P or Q, the number of transistors used to detect when a certain router_cell is selected (also referred to as a "hit") becomes increasingly complicated, and this cost is duplicated for all data wires. Therefore, according to one embodiment for a crossbar having a large P, Q, or data size, a hit[i,j] signal is computed in a single hit circuit rather than using the S and M wires directly. An example router_cell 1000 with 1-bit data and 2×1of4 control using a symmetric hit circuit is shown in FIG. 10. An alternate router_cell 1100 using an asymmetric hit circuit which does not check neutrality of $S[i]_1$ or $M[j]_1$ is shown in FIG. 11. The asymmetric hit circuit requires that the split_env and merge_env are modified to check the neutrality of $S[i]^1$ and $M[j]_1$, respectively.

Figure 12:
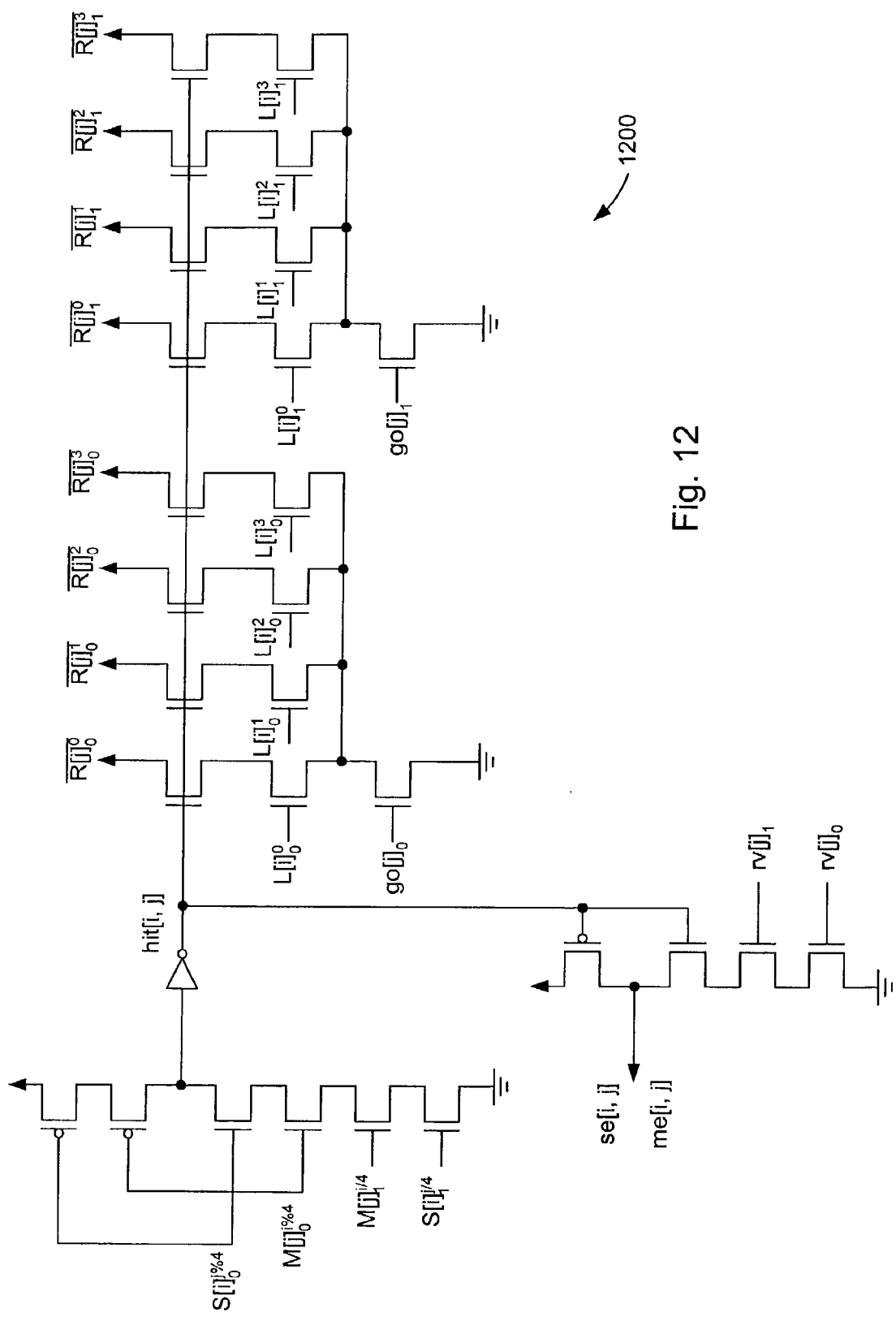
FIG. 12 is a schematic representation of a fourth implementation of a router cell

According to various embodiments, it is straightforward to modify the data encoding to other 1ofN codes, e.g., from a 1of1 to signal an event, to 1of4 for a good low power encoding of 2 bits, and so on. According to embodiments with larger data sizes, multiple 1ofN codes may be employed. FIG. 12 shows a router_cell 1200 with 4-bit data and control encoded with 2×1of4 channels, using the asymmetric hit circuit of FIG. 11. It is possible to use different $rv[j]_0/rv[j]_1$ and $go[j]_0/go[j]_1$ wires corresponding to each 1of4, as shown, or to combine them into single $rv[j]$ and $go[j]$ from the merge_env.

According to various specific embodiments, multicast may be supported in a crossbar designed according to the present invention. According to one such embodiment, the S[0 . . . P−1] control is changed from a 1ofQ code to a bitvector S[0 . . . P−1, 0 . . . Q−1] of 1of2 codes. Each S[i,j] bit goes directly to the router_cell[i,j]'s, where the $S[i,j]^1$ wire is used in the hit circuit instead of $S[i]^j$. In the split_env, the se[i,j] signals are first AND'ed with the inverse of $S[i,j]^0$ and then combined with a C-element tree instead of an AND tree. Essentially, multiple simultaneous hit's can occur for one input, and the split_env must check that they all complete. The merge side is controlled as before. It should be noted that implementations of the dispatch and arbiter circuits described subsequently herein may be configured to control such a multicast crossbar.

Various embodiments of an asynchronous crossbar designed according to the present invention are organized into several parallel chunks of less than the datapath size. Assuming the datapath size is B bits (which requires 2*B wires for the delay-insensitive code in this embodiment), the number of additional control wires used in a split is s, and the number of additional control wires used in merge is m (for an embodiment which uses 1-hot control encoding), if the datapath is broken up into chunks of C bits, then the wiring limited area of the crossbar will be (B/C)*P*Q*(2*C+s)*(2*C+m). Thus, the optimum C is $$\frac{\sqrt{s*m}}{2}.$$

Using this formula, a 32-bit datapath with 12 wires of split control overhead and 14 wires of merge control overhead should be broken into a chunk size of about 6 to 7 bits. In practice, other factors come into consideration, such as the desired speed of the circuit (which favors smaller chunks) and the convenience of various chunk sizes. For example, depending upon such considerations, a 32-bit crossbar could be implemented as 8 chunks of 4 bits (faster) or 4 chunks of 8 bits (smaller). Other chunk sizes might have unacceptable area, speed, or inconvenience penalties but are still within the scope of the present invention.

Various techniques for generating the S[i] and M[j] control channels for an asynchronous crossbar will now be described. It will be understood that such techniques may be applied to any of a variety of asynchronous crossbar architectures including, for example, the different crossbars described above. That is, the dispatch and arbiter circuits described herein may be employed not only to control any of the crossbar circuits designed according to the invention, but any type of crossbar circuit having the basic functionality of interconnecting P input channels with Q output channels. According to various embodiments, control of multicast crossbars and two-way transactions may also be provided by specific implementations of these circuits.

According to various embodiments of the invention, the partial (or projected) order of the data transfers in a P to Q crossbar, i.e., the order of operations when projected on a given channel, should be deterministic. That is, the order of operations which involve a certain channel happen in a deterministic order, but operations on different channels can happen in any order relationship to each other. Thus, according to one such embodiment, a dispatcher is provided which solves the following problem: Given an ordered sequence of input instructions on channels L[0 . . . P−1], route each instruction to one of R[0 . . . Q−1] output channels specified by a TO[0 . . . P−1] channel for that instruction.

The dispatcher must maintain the order of instructions to each output channel. However, it is not required that instructions to different output channels are delivered in order. This allows internal pipelining in the implementation, arbitrary buffering on all channels, and multiple simultaneous transfers.

Where P is 1, a straightforward implementation of dispatcher is just an Q-way split bus, using L, and TO as S, and R[0 . . . Q−1 ]. According to an even more specific embodiment, additional buffering may be provided on the output channels to allow later instructions to be issued despite an earlier stalled instruction to a different R.

According to another embodiment, multiple instructions are issued in parallel with proper ordering using a crossbar. The L[i] and R[j] data channels of the dispatcher connect directly to the crossbar. The TO[i] of the dispatcher is copied to the crossbar's S[i]. The M[j] crossbar control channels are derived from the TO[i]'s such that they maintain the program order projected on each output channel. According to one embodiment, this is accomplished in the following manner.

Figure 13:
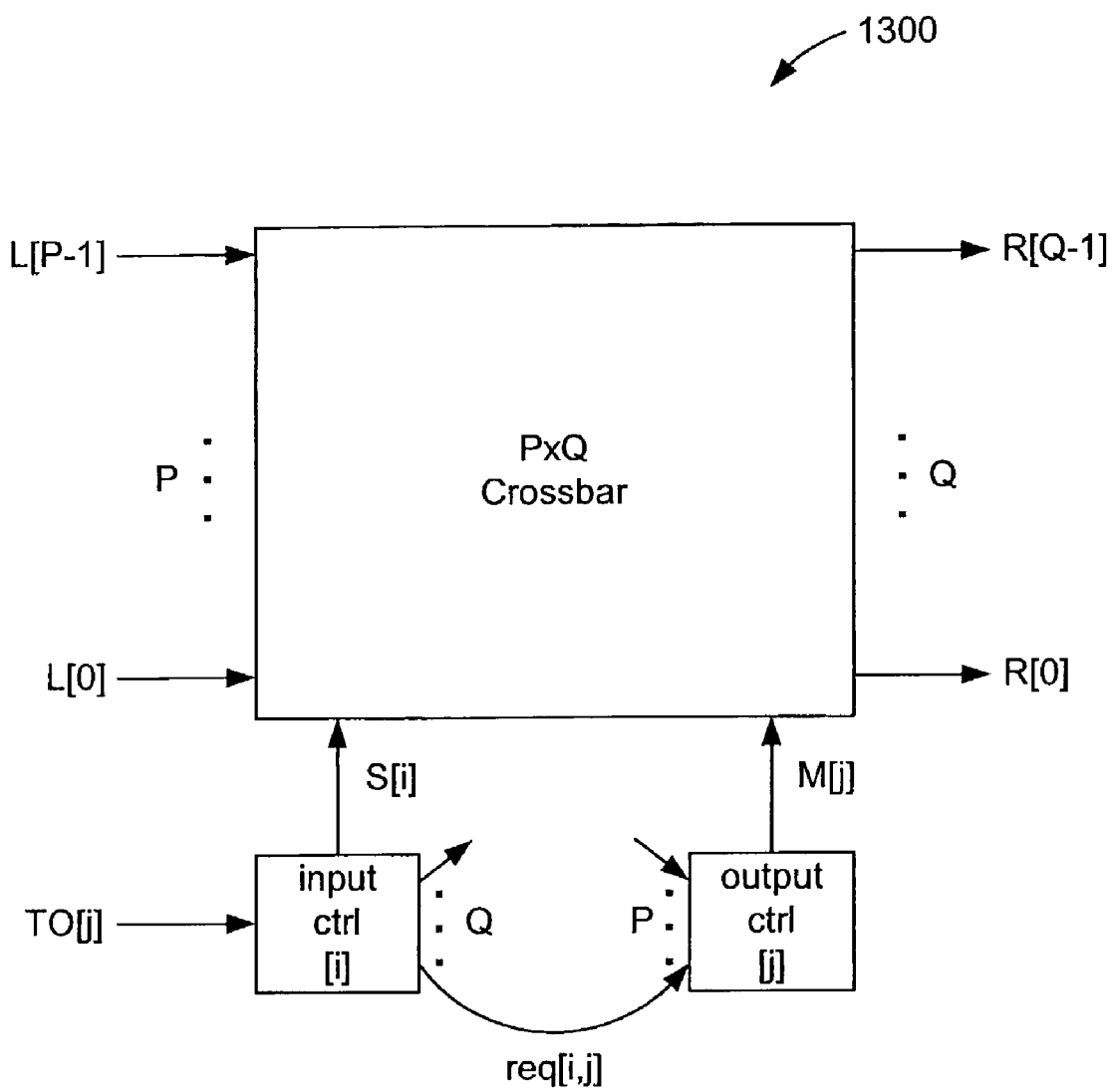
FIG. 13 is a representation of a dispatcher for use with any of a variety of crossbar circuits.

Referring to dispatcher 1300 of FIG. 13, each input_ctrl[i] sends a request bit req[i, j] (e.g., a 1of2 code) to each output_ctrl[j] indicating whether or not this input wishes to go to that output based on TO[i]. Then each output_ctrl[j] collects these bits from all input_ctrl's and determines the indices of each 1 in cyclic order. These indices control the M[j] channel of the crossbar. The crossbar then transfers the payload.

The input controller, e.g., the input_ctrl[i] circuit, to produce the req[i,j] bits and copy TO[i] to S[i] may be derived using the approach described in "Pipelined Asynchronous Circuits" by A. Lines incorporated by reference above.

Each output controller (also referred to herein as a combine) accepts a bitvector and reads off the positions of all 1's in cyclic order from input 0 to P−1. According to one embodiment, this is achieved using a binary tree structure. Each stage in the tree receives the number of 1's on its lower significance L input, then from its higher significance H input, and outputs the sum to the next stage of the tree. These numbers are encoded serially with a 1of3 code with the states: zero, last, and not-last. For example, 3 is represented by the sequence: not-last, not-last, last.

Each tree stage also outputs a 1of2 channel to indicate whether the 1 came from the low (0) or high (1) sides. This extra channel becomes the MSB bit of the index so far. The LSB bits so far are obtained by a 2-way merge of the index from either the low or high previous stage, controlled by the current MSB bit. The final 1of3 bitsum of the tree is discarded, and the accumulated index bits become the M control for the crossbar.

Figure 14:
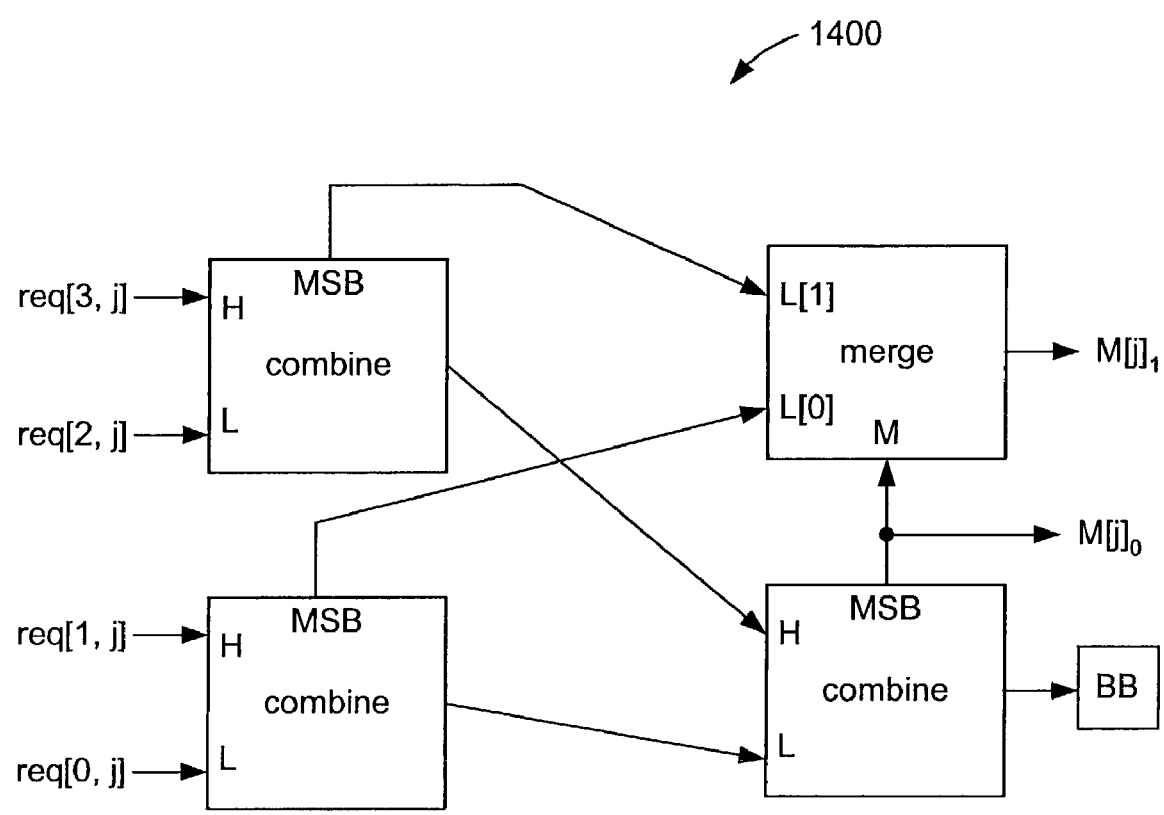
FIG. 14 is a representation of an output controller portion of a dispatcher.

According to various specific embodiments of the invention, the combine may be implemented using the approach described in "Pipelined Asynchronous Circuits" by A. Lines incorporated by reference above. In such embodiments, one internal state bit is provided to distinguish sequences coming from the left or right sides. FIG. 14 shows a 4-way tree combine 1400. The CSP for a specific embodiment of such a combine circuit is as follows:

```
"zero":=0, "notlast":=1, "last":=2;
*[L?l;
[l="zero" -> H?h;
    [ h="zero" -> R!"zero",          done:=true
    []h="notlast" -> R!"notlast", M!1, done:=false
    []h="last"-> R!"last", M!1, done:=true
    ];
    *[~done -> H?h;
        []h="notlast"-> R!"notlast", M!1
        [9 ]h="last" -> R!"last", M!1, done:=true
        ]
    ]
[]l="notlast" -> R!"notlast", M!0
[]l="last" -> M!0, H?h;
    [ h="zero" -> R!"last",
done:=true
    []h="notlast" -> R!"notlast", R!"notlast", M!1,
done:=false
    []h="last" -> R!"notlast", R!"last", M!1,
done:true
    ];
    *[~done -> H?h;
        []h="notlast" -> R!"notlast", M!1
        []h="last" -> R!"last", M!1, done:=true
        ]
        ]
]
]
```

L and H are input request counts encoded serially with 1of3 codes. R is the output request count encoded serially. M is the most-significant-bit of the next index so far and controls the merge of the accumulated least-significant-bits from previous stages.

Although the combine can be implemented as a tree using existing techniques, a smaller implementation which may be advantageous for large fanins is also provided which uses a rippling ring circuit which inspects each input request in cyclic order, driving a corresponding 1ofN data rail if its input is 1, or skipping ahead if the input is 0. The rails of this 1ofN code must be kept exclusive. This version of the combine has irregular throughput and latency characteristics, and may only be valuable for its area savings for large fanins.

According to various specific embodiments, a crossbar is used to execute a series of "move" instructions, each of which specifies an input port and an output port of the crossbar and transfers several tokens across that link. In one such embodiment, the move instruction identifies the input port, the output port, and a repeat count. According to an even more specific embodiment, an ordered sequence of these move instructions is issued in parallel via two dispatch circuits. It will be understood that the repeat count is merely one mechanism which this embodiment may employ.

Figure 15:
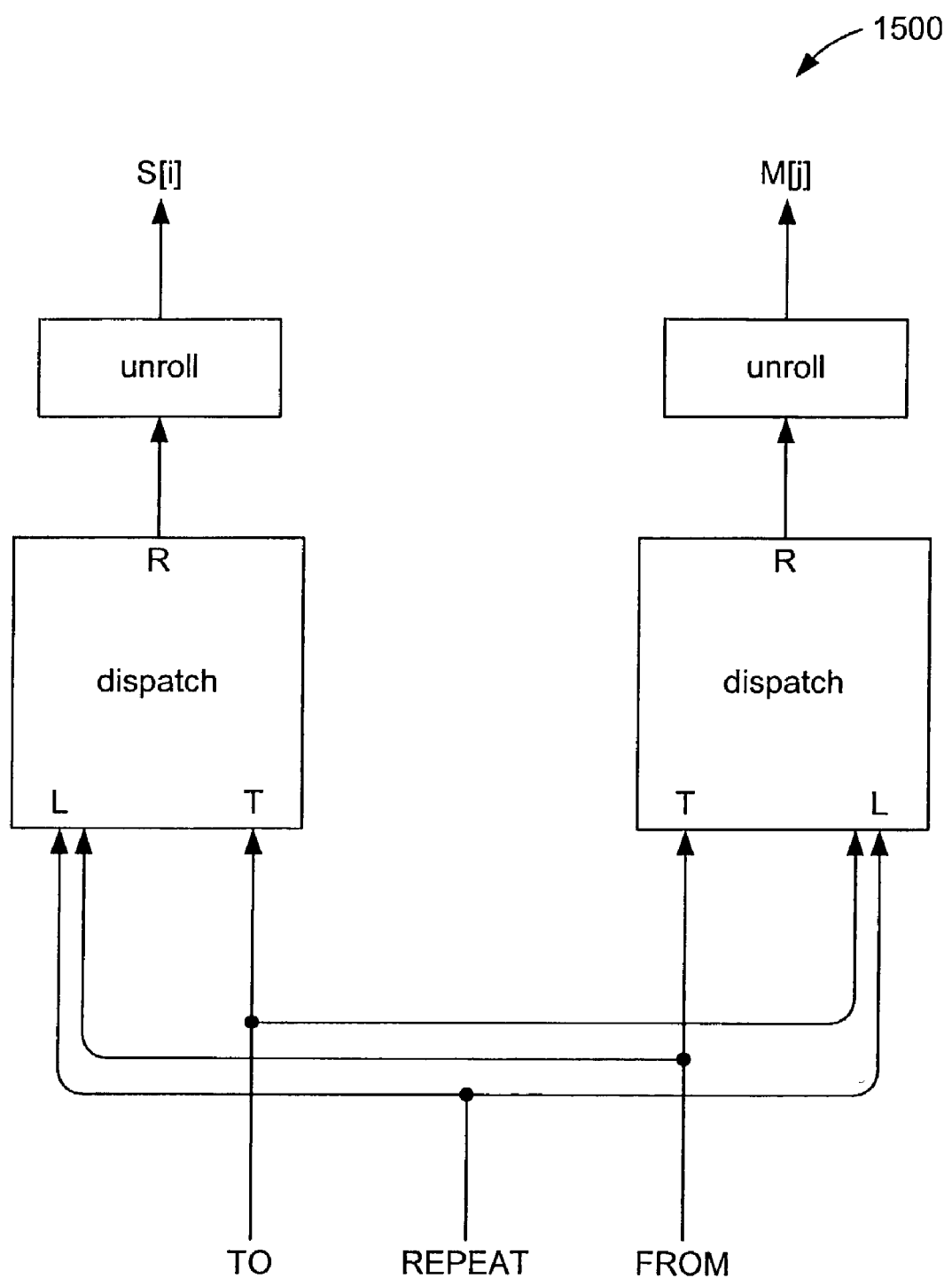
FIG. 15 is another representation of a dispatcher for use with any of a variety of crossbar circuits.

According to this embodiment, the first dispatch circuit dispatches the output port and repeat count to the specified input port. The second dispatches the input port and repeat count to the output port. That is, the move instruction is copied two ways, with either the input or output port serving as the S control for the corresponding dispatches. The repeat count is unrolled locally to the input and output ports. That is, the same crossbar control is reissued until the count is used up. A specific implementation of a dispatcher 1500 having two such dispatch circuits is shown in FIG. 15.

The use of the dispatchers ensures that the moves will be executed in the original program order if they have either port in common, but may execute them out of order or in parallel if they refer to different ports. The dispatchers are also capable of scaling up to a very large number of move instructions at once. This can be used as an optimization to avoid wasting power or bandwidth in the dispatcher, and also can greatly compress the original instruction stream.

Another embodiment of the invention facilitates use of a crossbar as a message passing communications interconnect. According to this embodiment, it is assumed that each input port provides the desired destination port number on a TO channel, which becomes the S control of the crossbar. Each input port requests permission to use the desired output port. Each output port generates the M control by arbitrating among the requests from all inputs contending for access to the same output. An optional FROM channel can be sent with the output which may comprise, for example, a copy of the M control of the crossbar. Such an option may be useful, for example, with certain communication protocols in which it is desirable to know the identity of the sender.

The control per input copies the TO to S and uses it as the control for a split bus which sends a 1of1 request channel req[i,j] to the intended output control. The control per output collects the requests from the input controls and arbitrates among them. The result of the arbitration is used as the M of the crossbar, and may also be copied to a FROM channel if desired.

Figure 16:
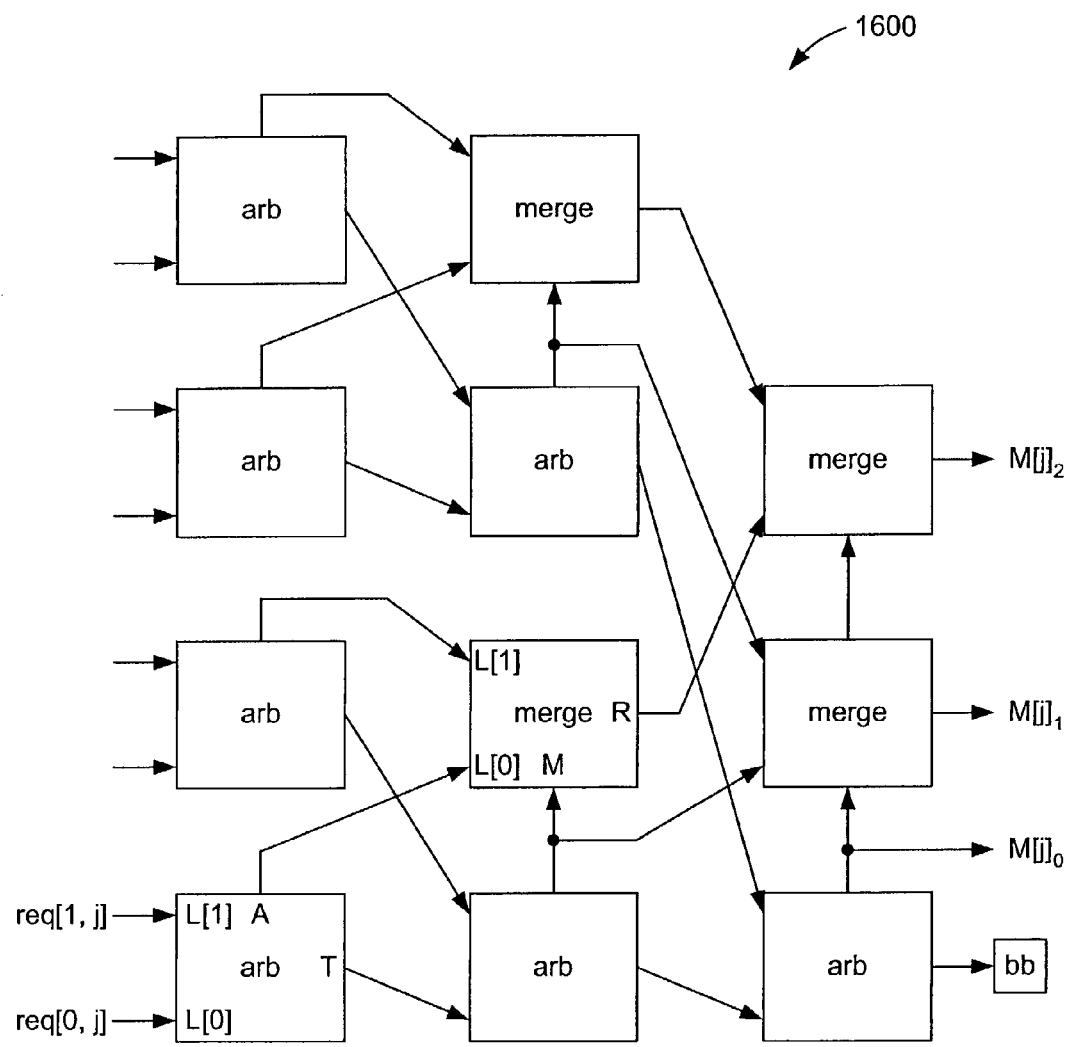
FIG. 16 is a representation of an arbiter for use with any of a variety of crossbar circuits.

According to one embodiment, a P-way arbiter which arbitrates among the requests is built as a binary tree, much like the combine of the last section. Each stage in the binary tree receives a request from either the left (e.g., lower indices) or right (e.g., higher indices) sides of the previous stage. It outputs a 1of2 channel for the winner's MSB to a side tree of merge's which accumulate the index of the winner, just as for the combine. It sends a 1of1 to request the next stage of the tree. FIG. 16 shows a tree structure 1600 for an 8-way arbiter.

Figure 17:
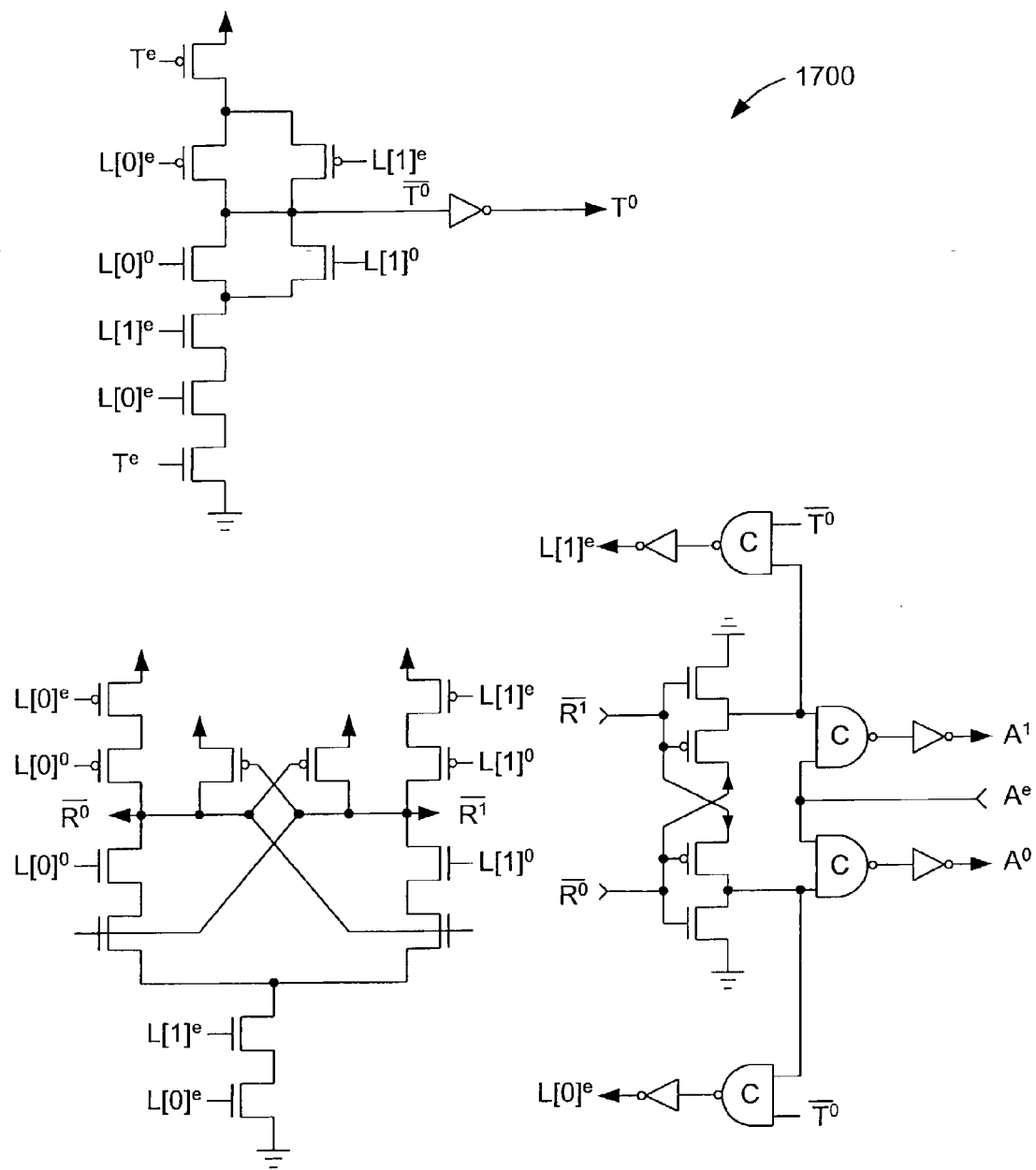
FIG. 17 is a schematic representation of an output controller portion of an arbiter.

According to a specific embodiment of an arbiter, the circuit for each stage of the arbiter includes metastability. The CSP is:

*[$\overline{L[0]}$→L[0]?, T!, A!0|$\overline{L[1]}$→L[1]?, T!, A!1]

where L[0 . . . 1] are the trigger inputs, T is the trigger output, and A is the arbitration result. FIG. 17 shows one implementation of a circuit 1700 with this behavior. According to this embodiment, the output request is made by OR'ing the input requests and is not metastable. Only the side 1of2 A output employs actual arbitration and a metastability filter. This arbiter tree is weakly fair, and works as first-come-first-serve if contending requests are spaced out enough in time. If the contending requests come faster, all requests will be serviced, but not necessarily at strictly fair rates.

According to a further embodiment, arbitrated control of a crossbar is facilitated by an arbiter which avoids deadlock conditions. As mentioned above, the crossbar controlled by such an arbiter may be any type of crossbar including, but not limited to, those described herein.

Suppose an input port A is trying to go to output C then D, and another input port B is trying to go to outputs D then C. Due to slack in the request and arbitration channels, it is possible under a delay insensitive timing model that A would win D and B would win C. But A is trying to send to C first, and B is trying to send to D first. Thus, the system deadlocks.

Thus, according to a specific embodiment, "slack" is eliminated so that an input can't make another request until the previous one has won its arbitration. This is done by introducing a "grant" token (e.g., a 1of1 channel) which is returned by the output port to the input port when that input wins the arbitration. This mechanism prevents inputs from making more than one outstanding request.

Figure 18:
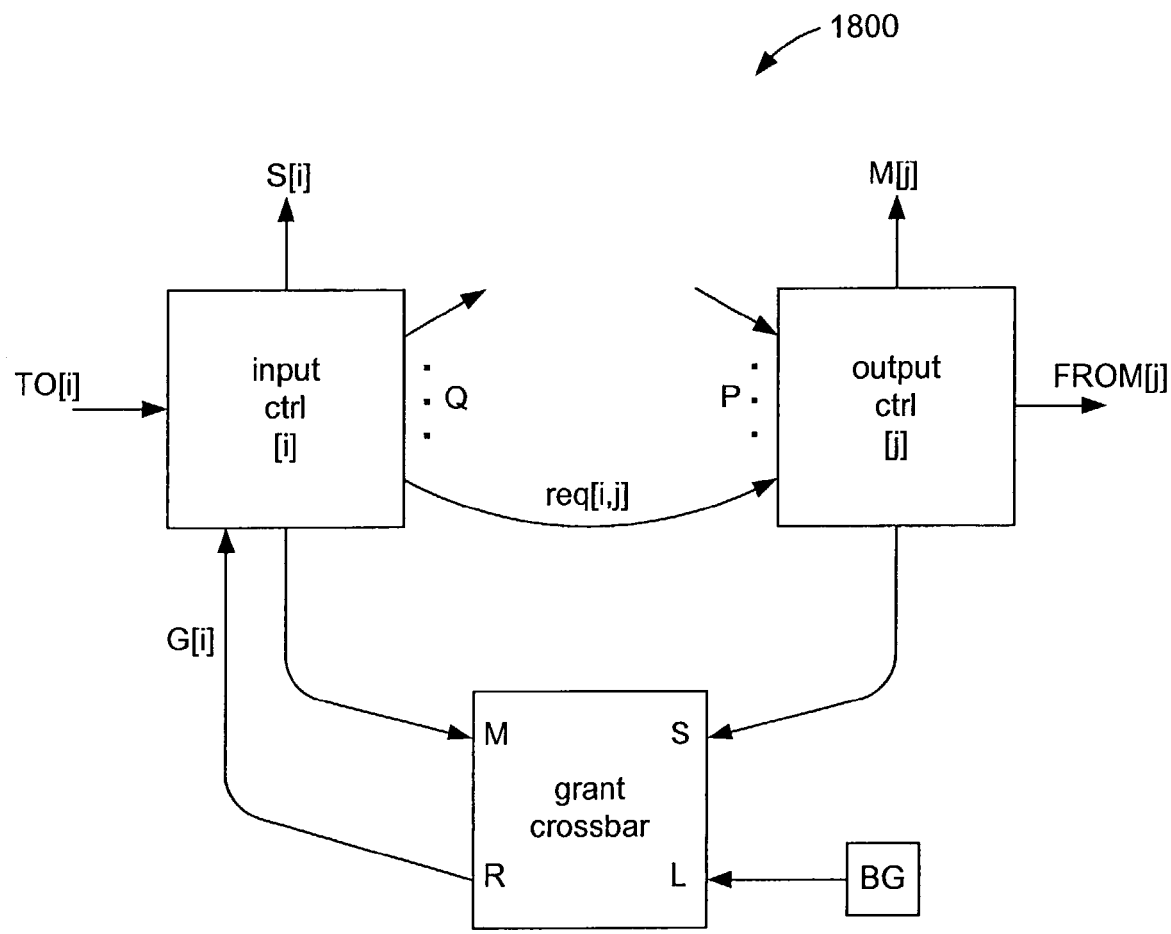
FIG. 18 is another representation of an arbiter for use with any of a variety of crossbar circuits.

According to one implementation, the grant is returned via a small crossbar with its S control copied from the output's M and its M control copied from the input's S. The output R 1of1 data channel is fed into the input's split bus. The input side starts with a single grant token. FIG. 18 shows an arbiter 1800 for effecting arbitrated control for a crossbar using this grant scheme.

The grant crossbar of the present invention is also operable to establish a useful ordering relationship. Suppose an input sends some data to output B, then sends a notification to output C that the data is ready. If C then reads it from B, it will get the value that A wrote, because A's communication to B won the arbitration first. This satisfies the producer-consumer ordering model required by many bus protocols.

According to other embodiments of the invention, alternatives to using such a grant crossbar are provided. In general, to avoid deadlock, it is necessary to avoid winning the arbitrations in a different order from which they were requested. One way to do this is to implement the request/arbiter circuits with a total of 1 or less slack, such that a second request will always be blocked until the first one has been granted. This avoids the need for a grant crossbar, and can be smaller. However, this zero-slack design reduces the throughput (since the circuits cannot precharge in parallel with another request starting) and requires different zero-slack implementations of the components instead of the usual pipelined building blocks. The grant crossbar is effectively a way of forcing the pipeline to have 1 slack even if it is built out more pipelined elements.

Transactions in a typical system interconnect often have atomic sizes larger than one word. That is, for one request and arbitration, many cycles of data may need to be transferred. This can be achieved according to one embodiment of the present invention by associating a "tail" bit with the data through the main crossbar. According to this embodiment, the tail bit is sampled both by the input and output ports, and is fed into a simple control unit which repeats the same control values until the tail bit is 1. According to other embodiments, a simple counter may be employed using information associated with the data itself (e.g., in a packet) or which comes with the control data controlling the crossbar. As will be understood, these are merely examples of mechanisms which embodiments of the invention may employ to effect the transfer of data of arbitrary size. The scope of the invention should not be so limited.

Figure 19:
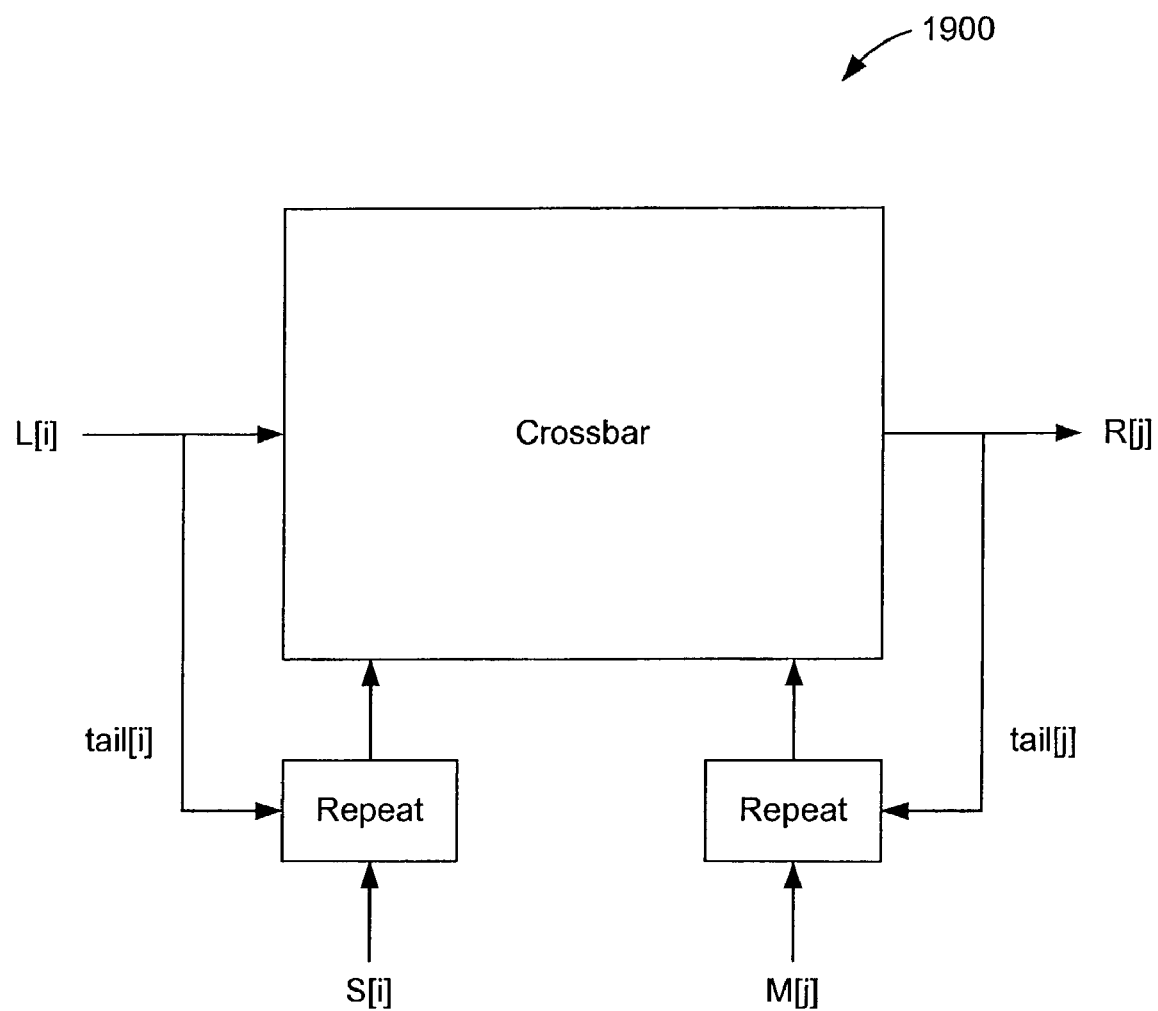
FIG. 19 is a representation of a datapath crossbar.

A request/arbitrate circuit designed according to specific embodiments of the present invention is concerned only with "packets" and sets up the datapath link according to the received control values. The datapath crossbar can transfer a large block of data, then release the link after the last cycle by setting the tail bit to 1. FIG. 19 shows a datapath crossbar 1900 with the extra repeaters on the control inputs. According to an alternate embodiment, a repeat count could be used instead of the tail bit. However, the tail bit may be easier to implement in the hardware, and doesn't prohibit also specifying lengths in the data packets.

According to further embodiments of the invention, two different crossbar datapaths are controlled using a single arbitrated control circuit to implement two-way transactions. According to one such embodiment, input and output 1of2 channels LTYPE and RTYPE are added to an arbiter circuit designed according to the invention for each port. If the LTYPE channel is 1, the normal S/M control is also copied to become the M/S control of a second crossbar for a returning transaction. If the LTYPE channel is 0, the second crossbar isn't used. The information in the LTYPE channel is copied to the RTYPE channel of the output, so that the target unit knows whether or not to respond. This implementation can support a mixture of 1-way transactions (e.g., store) and 2-way transactions (e.g., load, swap, read-modify-write). According to more specific embodiments, if the modules which are connected by the two crossbars are exclusively masters (initiators) or targets (responders), the two crossbars can be asymmetrically sized, (e.g., an 8×4 request crossbar and a 4×8 response crossbar). According to one such embodiment, this scheme is used to efficiently implement a shared memory bridge.

Some additional exemplary applications of the three types of asynchronous circuits described above will now be discussed. However, it will be understood that the crossbars, dispatchers, and arbiters of the present invention may be used in a wide variety of applications and that therefore the scope of the present invention is not limited to the applications described.

In one such exemplary application, a superscalar CPU with P-way instruction issue and Q pipelines could use a P×Q dispatcher to send instructions to the correct pipelines while preserving ordering to each pipeline. The TO control would be decoded from the instructions.

In other exemplary embodiments relating to RISC style superscalar asynchronous CPUs, crossbars can be used to route the Z result of any execution pipeline to any register, or to route the reads from any register to the X and Y operands of any pipeline. Each register could delay a write until the next access of that register, such that any data dependent read could be quickly bypassed. The latency from Z result to a dependent X or Y operand could be as little as 6 transitions, 2 each for the result crossbar, register itself, and operand crossbar. This low latency bypass feature eliminates the need for additional bypass circuitry. The control of these crossbars can be generated from parallel RISC instructions using variations on the "move" control scheme. This implementation is large, but allows significant reordering (i.e., it only retains the partial ordering projected on results, operands, and registers) and can scale to very wide issue designs. Even with a dual-issue CPU, this register file could often do more than two instructions at once for short bursts, which could help catch up after stalls.

According to various embodiments, an arbitrated crossbar designed according to the invention can be used to connect several modules on a chip. Each module would be given an input and output port on the crossbar. In some embodiments, each module would be able to send one-way tail-terminated packets to each of the other modules. Some modules could be memories, which could receive stores, and reply to load requests with load completion packets. Others could be I/O interfaces, especially those based on flow-controlled bidirectional FIFO's. Others could be CPU's or DSP's or ASIC's which can access the I/O's, memories, or send packets to each other. These packets could be used to implement cache coherence protocols or hardware supported message passing. In addition, legacy bus protocols such as PCI could be tunneled over such a crossbar since it supports the required ordering relationships.

According to further embodiments, an arbitrated crossbar designed according to the invention could act as a switch fabric for packet switching. Each incoming packet would have an in-band destination field which would be extracted for use as the TO control. The length of the packet would be converted into a tail bit sequence. The FROM output could be inserted back into the packet if desired. According to more specific embodiments, in the presence of contention, it may be desirable to add FIFOs on all inputs and outputs and make sure the whole system has a significant overspeed to recover from transient congestion.

While the invention has been particularly shown and described with reference to specific embodiments thereof, it will be understood by those skilled in the art that changes in the form and details of the disclosed embodiments may be made without departing from the spirit or scope of the invention. For example, as mentioned above, although specific embodiments have been described herein with reference to a delay-insensitive handshake protocol, various embodiments of the invention are provided in which different types of timing assumptions are made in otherwise delay-insensitive circuits.

For example, timing-assumptions may be used to make an otherwise delay-insensitive circuit faster and lower power at the cost of additional circuit verification engineering. The best timing assumption for a particular circuit depends on the critical path of the circuit and the amount of additional verification work a designer is willing to take on. Of particular interest are timing assumptions that are local to one four-phase handshake (described below), or one internal path within one cell between external handshakes. When this class of timing-assumptions is applied to complex cells with critical paths longer than the rest of the delay-insensitive circuitry, it is especially desirable. These timing assumptions apply to asynchronous circuits that use four-phase return to neutral handshakes, and generally use 1-hot data encoding.

In general, there are three types of timing assumptions which may apply to various embodiments of the invention. When the pulse timing assumption is applied to an otherwise delay insensitive four-phase handshake, all of the set conditions are completed, data validity, control validity, acknowledge validity, etc. However, the reset phase of the handshake is not completed and is assumed to happen with an adequate timing margin. In this scheme all signals, data, control, and all the acknowledge signals from output channels, are not checked in the reset-phase of the handshake, with the exception that occasionally an acknowledge signal is used opportunistically as a good pre-charge signal for the data. In some cases one may also forego checking the completion of the output data. This scheme requires that once the link is set up, nothing may block the data from being computed and the channels from going through the reset phase.

When the Implied-data-neutrality timing assumption is applied to an otherwise delay-insensitive four-phase handshake, the computed data on the output channels is completed in the set direction, but not in the reset phase. All acknowledges are still checked in all directions. This scheme requires that once the acknowledge of an output channel is set, no events may block the reset phase of the data channel.

Interfering operators are common in circuit design in general but are forbidden by the delay-insensitive timing model. Interference causes glitching. In delay-insensitive circuit design cut-off transistors prevent interference. However, with adequate timing margin, a circuit designer can guarantee glitch free operation in an otherwise delay-insensitive circuit.

A specific example of the use of such timing assumption in circuits designed according to the invention will be illustrative. A 16 to 16 ported 4-bit crossbar efficiently implemented according to a specific delay-insensitive approach of the present invention requires 20 transitions per cycle. However, a crossbar design with similar functionality may be implemented with the timing assumptions described above which requires only 12 transitions per cycle. This theoretically makes the circuit 67% faster.

Figure 20:
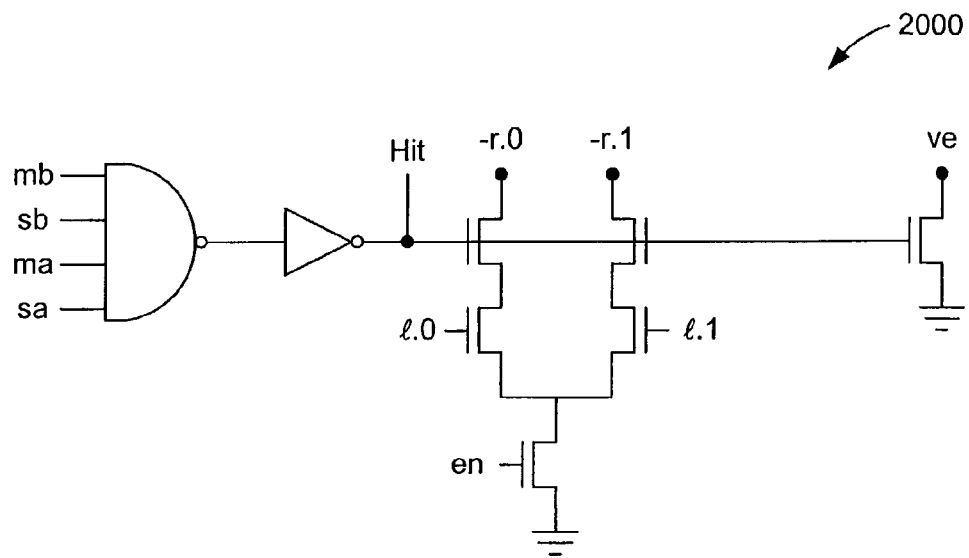
FIGS. 20a–20c show crossbar circuits for use in implementing a crossbar using various timing assumptions according to a specific embodiment of the invention.
Figure 20:
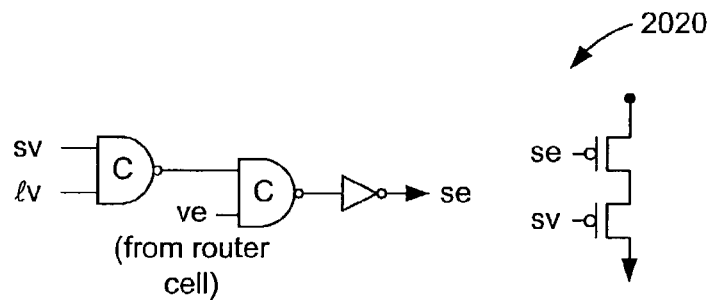
Figure 20:
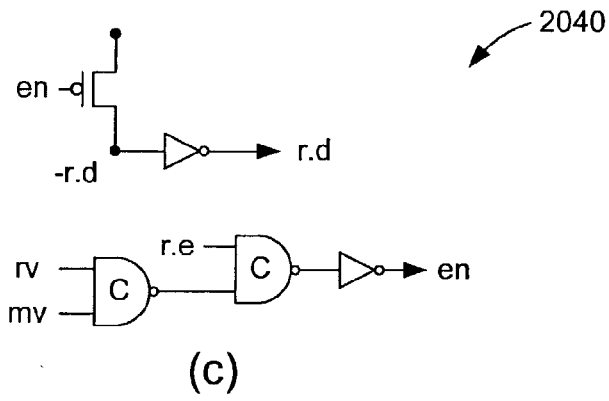

FIGS. 20a–20c show how the circuit diagrams for a router_cell 2000, a split_env 2020, and a merge_env 2040 may be modified with these timing assumptions (relative to their above-described counterparts) to create such a 12-transistion per cycle crossbar. The sv and lv signals represent the input completion of the l and s channels. The rv and mv signals represent the completion of the output data on channel r and the input control data on channel m.

The pulse timing assumption is used in the main data transfer through split_env→router_cell→merge_env. This allows the removal of 2 NAND gate completions, and the rv bus signal. It also reduces the response time from the L and S arrival to the SE (L and S acknowledge) from 9 transitions to 5. The interference timing assumption is used on the ve bus in the figure, however at a little extra cost one could produce a signal from the split_env and pass it into the ve bus to remove the interference timing assumption. In the buffers surrounding the split_env and merge_env, the implied-data-neutrality timing assumption is used to satisfy the non-blocking return-to-neutral requirement of the pulse timing assumption, and to keep the critical path of data completion on 2 1of4 codes to 12 transitions per cycle. It should be understood that there are numerous small trade offs in timing-assumptions that can be made in such circuits, all of which are within the scope of this invention.

In addition, while several specific embodiments of the invention have been described in the context of asynchronous circuit design, it is possible to map the event driven architecture of the crossbars described herein into a synchronous environment with the introduction of a clock signal and still remain within the scope of the invention. According to one such embodiment, a crossbar circuit architecture similar to that described above is implemented with the underlying channel model of a synchronous request-grant FIFO rather than an asynchronous four-phase channel. Since the crossbar is still based on the four independent FIFOs L, S, M, and R, all of the properties that come from implementing the crossbar with independent flow-controlled FIFO channels still apply. The difference is that data transactions begin aligned to a clock-edge boundary. Such an approach may be desirable, for example, in a single clock domain synchronous system because it relieves the requirement of going through synchronous to asynchronous conversion and back again.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An arbiter for controlling a crossbar having a first number of input channels and a first number of output channels such that plurality of instructions received on the input channels are routed to designated ones of the output channels according to instruction routing information, the arbiter comprising arbitration circuitry which arbitrates between instructions received on different input channels and designating a same output channel, and derives input channel control information and output channel control information from the instruction routing information, the input and output channel control information being for controlling the crossbar such that any of the different input channels are prevented from transmitting a subsequent instruction until arbitration between the different input channels is complete.

2. The arbiter of claim 1 wherein the arbitration circuitry employs M by 1ofN encoding for the instructions where M is an integer greater than or equal to one and N is an integer greater than or equal to two.

3. The arbiter of claim 1 wherein the arbitration circuitry employs 1ofN encoding for the instruction routing information where N is an integer greater than or equal to two.

4. The arbiter of claim 1 wherein the input channel control information is encoded using 1ofA and 1ofB encoding where A*B is the second number, and the output channel control information is encoded using 1ofC and 1ofD encoding where C*D is the first number.

5. The arbiter of claim 1 wherein the arbitration circuitry routes the instructions between each of the input channels and each of the output channels asynchronously.

6. The arbiter of claim 5 wherein the arbitration circuitry routes the instructions asynchronously using a handshake protocol.

7. The arbiter of claim 6 wherein the handshake protocol between a first sender and a first receiver on a link between a first input channel and a first output channel compnses:
   the first sender sets a data signal valid when an enable signal from the first receiver goes high;
   the first receiver lowers the enable signal upon receiving the valid data signal;
   the first sender sets the data signal neutral upon receiving the low enable signal; and
   the first receiver raises the enable signal upon receiving the neutral data signal.

8. The arbiter of claim 6 wherein the handshake protocol is delay-insensitive.

9. The arbiter of claim 1 wherein the arbitration circuitry is generates a request bit corresponding to each pair of the input and output channels with reference to the instruction routing information, each request bit indicating whether or not the corresponding input channel is to form a link with the corresponding output channel.

10. The arbiter of claim 9 wherein the arbitration circuitry generates the output channel control information for the crossbar by arbitrating among the request bits.

11. The arbiter of claim 10 wherein the arbitration circuitry which generates the output channel control information comprises a binary tree structure.

12. The arbiter of claim 11 wherein the binary tree structure comprises a plurality of arbitration circuits and merge circuits configured in a plurality of stages and arbitrates among the request bits by accumulating an index of a winning input channel.

13. The arbiter of claim 12 wherein behavior of a stage of the tree structure may be described using concurrent sequential processes (CSP) notation as follows:

*[$\overline{L[0]} \to \overline{L[0]}$?, T!, A!0$\overline{L[1]} \to L[1]$?, T!, A!1]

where L[0] and L[1] are trigger inputs, T is a trigger output, and A is an arbitration result.

14. The arbiter of claim 1 wherein the arbitration circuitry comprises grant circuitry which prevents deadlock of the arbiter by transmitting a grant token conesponding to the same output channel to an arbitration-winning input channel.

15. The arbiter of claim 14 wherein the grant circuitry comprises a grant crossbar which transmits the grant token in response to split control information and merge control information, the split control information being derived from the output channel control information, and the merge control information being derived from the input channel control information.

16. The arbiter of claim 14 wherein the grant circuitry is implemented with a slack of one or less such that a second request from a particular channel is blocked until a first request has been granted.

17. The arbiter of claim 1 wherein the arbitration circuitry comprises a second crossbar which facilitates transmission of data from any of the output channels to any of the input channels in response to split control information and merge control information, the split control information being derived from the output channel control information, and the merge control information being derived from the input channel control information.

18. The arbiter of claim 17 wherein arbitration circuitry generates the split control information and the merge control information only in response to an indication that a two-way transaction has been requested.

19. An integrated circuit comprising the arbiter of claim 1.

20. The integrated circuit of claim 19 wherein the integrated circuit comprises any of a CMOS integrated circuit, a GaAs integrated circuit, and a SiGe integrated circuit.

* * * * *

UNITED STATES PATENT AND TRADEMARK OFFICE
CERTIFICATE OF CORRECTION

PATENT NO. : 7,274,710 B2  Page 1 of 1
APPLICATION NO. : 10/237406
DATED : September 25, 2007
INVENTOR(S) : Cummings et al.

It is certified that error appears in the above-identified patent and that said Letters Patent is hereby corrected as shown below:

Col. 17, in line 3 of claim 7, change "compnses" to --comprises--.

Col. 17, in line 2 of claim 9, delete "is" before "generates".

Col. 18, in line 3 of claim 14, change "conesponding" to --corresponding--.

Signed and Sealed this

Twenty-eighth Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,274,710 B2
APPLICATION NO. : 10/237406
DATED : September 25, 2007
INVENTOR(S) : Cummings et al.

It is certified that error appears in the above-identified patent and that said Letters Patent is hereby corrected as shown below:

Col. 17, claim 7, line 30, change "compnses" to --comprises--.

Col. 17, claim 9, line 42, delete "is" before "generates".

Col. 18, claim 14, line 17, change "conesponding" to --corresponding--.

This certificate supersedes the Certificate of Correction issued October 28, 2008.

Signed and Sealed this

Twenty-fifth Day of November, 2008

JON W. DUDAS
*Director of the United States Patent and Trademark Office*